United States Patent
Liu et al.

(10) Patent No.: US 11,382,102 B2
(45) Date of Patent: Jul. 5, 2022

(54) DATA TRANSMISSION METHOD AND APPARATUS

(71) Applicant: HUAWEI TECHNOLOGIES CO., LTD., Guangdong (CN)

(72) Inventors: Hang Liu, Beijing (CN); Zhenzhen Cao, Beijing (CN); Mingchao Li, Beijing (CN); Xiao Xiao, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 54 days.

(21) Appl. No.: 16/898,866

(22) Filed: Jun. 11, 2020

(65) Prior Publication Data
US 2020/0305163 A1 Sep. 24, 2020

Related U.S. Application Data

(63) Continuation of application No. PCT/CN2017/115597, filed on Dec. 12, 2017.

(51) Int. Cl.
*H04W 72/04* (2009.01)
*H04L 5/00* (2006.01)
(Continued)

(52) U.S. Cl.
CPC ....... *H04W 72/0453* (2013.01); *H04L 5/0053* (2013.01); *H04L 5/0094* (2013.01); *H04W 52/367* (2013.01); *H04W 72/0446* (2013.01)

(58) Field of Classification Search
CPC ........... H04W 72/0453; H04W 52/367; H04W 72/0446; H04W 72/04; H04W 92/18;
(Continued)

(56) References Cited

U.S. PATENT DOCUMENTS

2010/0081391 A1* 4/2010 Suzuki .................. H04W 16/14
455/67.11
2016/0323869 A1 11/2016 Xu et al.
(Continued)

FOREIGN PATENT DOCUMENTS

CN 105307216 A 2/2016
CN 105338639 A 2/2016
(Continued)

OTHER PUBLICATIONS

3GPP TSG RAN Meeting #75,RP-170798:"New WID on 3GPP V2X Phase 2",Huawei, CATT, LG Electronics, HiSilicon, China Unicom,Dubrovnik, Croatia, Mar. 6-9, 2017,total 5 pages.
(Continued)

*Primary Examiner* — Diane L Lo
*Assistant Examiner* — Abusayeed M Haque
(74) *Attorney, Agent, or Firm* — Womble Bond Dickinson (US) LLP

(57) ABSTRACT

This application provides a data transmission method and apparatus, to improve data transmission reliability. The method includes: receiving, by a first terminal device, first indication information sent by a network device, where the first indication information is used to indicate a first preset condition, and the first preset condition is used to determine a resource used for sending data; determining, by the first terminal device from a first resource set according to the first indication information, a first resource that meets the first preset condition; and sending, by the first terminal device, first data by using the first resource.

18 Claims, 3 Drawing Sheets

(51) Int. Cl.
*H04W 4/00* (2018.01)
*H04W 92/18* (2009.01)
*H04W 52/36* (2009.01)

(58) Field of Classification Search
CPC ... H04W 52/383; H04L 5/0053; H04L 5/0094
See application file for complete search history.

(56) References Cited

U.S. PATENT DOCUMENTS

| | | | |
|---|---|---|---|
| 2016/0353499 A1* | 12/2016 | Takano | H04W 72/042 |
| 2017/0086028 A1 | 3/2017 | Hwang et al. | |
| 2017/0188375 A1 | 6/2017 | Seo et al. | |
| 2017/0325214 A1* | 11/2017 | Lu | H04W 76/14 |
| 2019/0090266 A1* | 3/2019 | Zhao | H04W 72/1205 |
| 2019/0116608 A1* | 4/2019 | Kim | H04W 72/1263 |
| 2020/0059896 A1* | 2/2020 | Xu | H04W 72/02 |
| 2020/0127800 A1* | 4/2020 | Tang | H04W 28/0215 |

FOREIGN PATENT DOCUMENTS

| | | | | |
|---|---|---|---|---|
| CN | 105960023 A | | 9/2016 | |
| CN | 106413097 A | | 2/2017 | |
| CN | 106488385 A | | 3/2017 | |
| WO | WO-2017008227 | * | 7/2015 | ......... H04W 74/006 |
| WO | 2017008227 A1 | | 1/2017 | |
| WO | 2017193283 A1 | | 11/2017 | |

OTHER PUBLICATIONS

Huawei et al.,"Discussion on resource pool sharing between mode3 and mode4 UEs", 3GPP TSG-RAN WG2 Meeting #99bis, R2-1710087, Prague, Czech Republic, Oct. 9-13, 2017, total 4 pages.

Huawei, HiSilicon, Discussion on resource pool sharing between mode3 and mode4 Ues. 3GPP TSG-RAN WG2 Meeting #100, Reno, USA, Nov. 27-Dec. 1, 2017, R2-1712747, 4 pages.

* cited by examiner

DATA TRANSMISSION METHOD AND APPARATUS

CROSS-REFERENCE TO RELATED APPLICATIONS

This application is a continuation of International Application No. PCT/CN2017/115597, filed on Dec. 12, 2017, the disclosure of which is hereby incorporated by reference in its entirety.

TECHNICAL FIELD

This application relates to the communications field, and more specifically, to a data transmission method and apparatus in the communications field.

BACKGROUND

Communication modes in an Internet of Vehicles system are collectively referred to as V2X communication (vehicle to everything). For example, the V2X communication includes vehicle-to-vehicle (V2V) communication, vehicle-to-infrastructure (V2I) communication, vehicle-to-pedestrian (V2P) communication, or vehicle-to-network (V2N) communication.

The V2X communication may use direct link communication. The direct link communication mainly includes two transmission modes: a centralized scheduling transmission mode and a distributed transmission mode. In the centralized scheduling transmission mode, a transmit end device may send data to a receive end device based on a resource scheduled by a base station. In the distributed transmission mode, the base station may configure a resource pool for the transmit end device by using a system information block (SIB) message or radio resource control (RRC) signaling, or a resource pool is preconfigured on the transmit end device, so that the transmit end device can independently select a resource from the configured or preconfigured resource pool to send data.

Because a terminal device that performs communication based on the distributed transmission mode independently selects a resource from a resource pool configured or preconfigured by a network device to send data, different terminal devices that perform communication based on the distributed transmission mode may possibly select a same resource to send data. Consequently, a transmission collision occurs, thereby reducing data transmission reliability and affecting data transmission efficiency.

SUMMARY

This application provides a data transmission method and apparatus, to improve data transmission reliability.

According to a first aspect, a data transmission method is provided, and the method includes:

receiving, by a first terminal device, first indication information sent by a network device, where the first indication information is used to indicate a first preset condition, and the first preset condition is used to determine a resource used for sending data;

determining, by the first terminal device, a first resource set, and determining, from the first resource set according to the first indication information, a first resource that meets the first preset condition; and sending, by the first terminal device, first data by using the first resource.

Therefore, according to the data transmission method in this embodiment of this application, the network device sends the first indication information that is used to indicate the first preset condition, so that the first terminal device (any terminal device in at least one terminal device) can determine the first resource based on the first preset condition indicated by the first indication information. Compared with a prior-art manner in which the first terminal device independently selects the first resource, this embodiment can reduce a case in which the first terminal device and another terminal device send data by using a same resource (in other words, reduce a resource collision probability), to implement global system optimization and improve data transmission reliability.

In one embodiment, the first preset condition includes at least one of the following:

a carrier of the resource used for sending data belongs to at least one carrier;

a subcarrier spacing of the resource used for sending data belongs to at least one subcarrier spacing;

a transmission time interval of the resource used for sending data belongs to at least one transmission time interval;

a quantity of resource units of the resource used for sending data is greater than or equal to a first value;

the quantity of resource units of the resource used for sending data is less than or equal to a second value;

the quantity of resource units of the resource used for sending data falls within a first value range;

power on the resource used for sending data is less than or equal to a first power threshold;

the power on the resource used for sending data is greater than or equal to a second power threshold;

the power on the resource used for sending data falls within a first power range;

the power on the resource used for sending data falls beyond a second power range;

a time domain range corresponding to the resource used for sending data belongs to a first time domain range; and a frequency domain range corresponding to the resource used for sending data belongs to a first frequency domain range.

In one embodiment, if the first preset condition includes that the carrier of the resource used for sending data belongs to the at least one carrier, the first indication information includes information used to indicate the at least one carrier;

if the first preset condition includes that the subcarrier spacing of the resource used for sending data belongs to the at least one subcarrier spacing, the first indication information includes information used to indicate the at least one subcarrier spacing;

if the first preset condition includes that the transmission time interval of the resource used for sending data belongs to the at least one transmission time interval, the first indication information includes information used to indicate the at least one transmission time interval;

if the first preset condition includes that the quantity of resource units of the resource used for sending data is greater than or equal to the first value, the first indication information includes information used to indicate the first value;

if the first preset condition includes that the quantity of resource units of the resource used for sending data is less than or equal to the second value, the first indication information includes information used to indicate the second value;

if the first preset condition includes that the quantity of resource units of the resource used for sending data falls within the first value range, the first indication information includes information used to indicate the first value range;

if the first preset condition includes that the power on the resource used for sending data is less than or equal to the first power threshold, the first indication information includes information used to indicate the first power threshold;

if the first preset condition includes that the power on the resource used for sending data is greater than or equal to the second power threshold, the first indication information includes information used to indicate the second power threshold;

if the first preset condition includes that the power on the resource used for sending data falls within the first power range, the first indication information includes information used to indicate the first power range;

if the first preset condition includes that the power on the resource used for sending data falls beyond the second power range, the first indication information includes information used to indicate the second power range;

if the first preset condition includes that the time domain range corresponding to the resource used for sending data belongs to the first time domain range, the first indication information includes information used to indicate the first time domain range; or if the first preset condition includes that the frequency domain range corresponding to the resource used for sending data belongs to the first frequency domain range, the first indication information includes information used to indicate the first frequency domain range.

In one embodiment, the method further includes:

determining, by the first terminal device, a second resource configured by the network device for the first terminal device; and the sending, by the first terminal device, first data by using the first resource includes:

sending, by the first terminal device, the first data by using the first resource and the second resource.

Therefore, according to the data transmission method in this embodiment of this application, when interference to a resource in the first resource set is relatively strong, a resource that can be used to send the first data may be difficult to meet quality of service (QoS) of the data. In this case, the first terminal device may send the first data by using the determined first resource and the second resource configured by the network device for the first terminal device, to further ensure data transmission reliability.

In one embodiment, before the receiving, by a first terminal device, first indication information sent by a network device, the method further includes:

sending, by the first terminal device, second indication information to the network device, where the second indication information is used to indicate a quantity of target resource units in a target measurement resource set that meet a second preset condition, and/or the second indication information is used to indicate a proportion of the target resource units in the target measurement resource set that meet the second preset condition in the target measurement resource set, where the second preset condition includes at least one of the following:

power on the target resource unit is less than or equal to a third power threshold;

the power on the target resource unit is greater than or equal to a fourth power threshold;

the power on the target resource unit falls within a third power range; and the power on the target resource unit falls beyond a fourth power range.

Therefore, according to the data transmission method in this embodiment of this application, the first terminal device reports, to the network device, the second indication information that is used to indicate a size of a target resource unit (for example, a size and/or a proportion of the target resource unit) that meets the second preset condition in the target measurement resource set. In comparison with the prior art in which the first terminal device reports, to the network device, a specific location of a resource that meets a condition (for example, a resource with relatively weak interference or a resource with strong interference), space resources occupied by signaling can be reduced especially when a relatively large quantity of resources are reported, thereby reducing a delay caused by reporting the specific location, and improving timeliness of scheduling by the network device.

In one embodiment, a carrier of a resource in the target measurement resource set is a second carrier;

a subcarrier spacing of a resource in the target measurement resource set is a second subcarrier spacing;

a transmission time interval of a resource in the target measurement resource set is a second transmission time interval;

a time domain range corresponding to a resource in the target measurement resource set belongs to a second time domain range; or a frequency domain range corresponding to a resource in the target measurement resource set belongs to a second frequency domain range.

In one embodiment, resources in the target measurement resource set at least partially overlap with resources in the first resource set.

In one embodiment, the first resource set includes a common resource, and the common resource is a resource shared by the first terminal device and a second terminal device.

In one embodiment, the first indication information is corresponding to at least one of the following content:

a data priority, a service type, a destination address, data reliability, a data delay, and a quality of service flow.

In one embodiment, the sending, by the first terminal device, first data by using the first resource includes:

sending, by the first terminal device, the first data to the second terminal device or the network device.

According to a second aspect, a data transmission method is provided, and the method includes:

determining, by a network device, first indication information, where the first indication information is used to indicate a first preset condition, and the first preset condition is used to determine a first resource; and sending, by the network device, the first indication information to a first terminal device.

Therefore, according to the data transmission method in this embodiment of this application, the network device sends the first indication information that is used to indicate the first preset condition, so that the first terminal device (any terminal device in at least one terminal device) can determine the first resource based on the first preset condition indicated by the first indication information. Compared with a prior-art manner in which the first terminal device independently selects the first resource, this embodiment can reduce a case in which the first terminal device and another terminal device send data by using a same resource (in other words, reduce a resource collision probability), to implement global system optimization and improve data transmission reliability.

In one embodiment, the first preset condition includes at least one of the following:

a carrier of a resource used for sending data belongs to at least one carrier;

a subcarrier spacing of the resource used for sending data belongs to at least one subcarrier spacing;

a transmission time interval of the resource used for sending data belongs to at least one transmission time interval;

a quantity of resource units of the resource used for sending data is greater than or equal to a first value;

the quantity of resource units of the resource used for sending data is less than or equal to a second value;

the quantity of resource units of the resource used for sending data falls within a first value range;

power on the resource used for sending data is less than or equal to a first power threshold;

the power on the resource used for sending data is greater than or equal to a second power threshold;

the power on the resource used for sending data falls within a first power range;

the power on the resource used for sending data falls beyond a second power range;

a time domain range corresponding to the resource used for sending data belongs to a first time domain range; and a frequency domain range corresponding to the resource used for sending data belongs to a first frequency domain range.

In one embodiment, if the first preset condition includes that the carrier of the resource used for sending data belongs to the at least one carrier, the first indication information includes information used to indicate the at least one carrier;

if the first preset condition includes that the subcarrier spacing of the resource used for sending data belongs to the at least one subcarrier spacing, the first indication information includes information used to indicate the at least one subcarrier spacing;

if the first preset condition includes that the transmission time interval of the resource used for sending data belongs to the at least one transmission time interval, the first indication information includes information used to indicate the at least one transmission time interval;

if the first preset condition includes that the quantity of resource units of the resource used for sending data is greater than or equal to the first value, the first indication information includes information used to indicate the first value;

if the first preset condition includes that the quantity of resource units of the resource used for sending data is less than or equal to the second value, the first indication information includes information used to indicate the second value;

if the first preset condition includes that the quantity of resource units of the resource used for sending data falls within the first value range, the first indication information includes information used to indicate the first value range;

if the first preset condition includes that the power on the resource used for sending data is less than or equal to the first power threshold, the first indication information includes information used to indicate the first power threshold;

if the first preset condition includes that the power on the resource used for sending data is greater than or equal to the second power threshold, the first indication information includes information used to indicate the second power threshold;

if the first preset condition includes that the power on the resource used for sending data falls within the first power range, the first indication information includes information used to indicate the first power range;

if the first preset condition includes that the power on the resource used for sending data falls beyond the second power range, the first indication information includes information used to indicate the second power range;

if the first preset condition includes that the time domain range corresponding to the resource used for sending data belongs to the first time domain range, the first indication information includes information used to indicate the first time domain range; or if the first preset condition includes that the frequency domain range corresponding to the resource used for sending data belongs to the first frequency domain range, the first indication information includes information used to indicate the first frequency domain range.

In one embodiment, before the sending, by the network device, the first indication information, the method further includes:

receiving, by the network device, second indication information sent by the first terminal device, where the second indication information is used to indicate a quantity of target resource units in a target measurement resource set that meet a second preset condition, and/or the second indication information is used to indicate a proportion of the target resource units in the target measurement resource set that meet the second preset condition in the target measurement resource set, where the second preset condition includes at least one of the following:

power on the target resource unit is less than or equal to a third power threshold;

the power on the target resource unit is greater than or equal to a fourth power threshold;

the power on the target resource unit falls within a third power range; and the power on the target resource unit falls beyond a fourth power range.

Therefore, according to the data transmission method in this embodiment of this application, the first terminal device reports, to the network device, the second indication information that is used to indicate a size of a target resource unit (for example, a size and/or a proportion of the target resource unit) that meets the second preset condition in the target measurement resource set. In comparison with the prior art in which the first terminal device reports, to the network device, a specific location of a resource that meets a condition (for example, a resource with relatively weak interference or a resource with strong interference), space resources occupied by signaling can be reduced especially when a relatively large quantity of resources are reported, thereby reducing a delay caused by reporting the specific location, and improving timeliness of scheduling by the network device.

In one embodiment, a carrier of a resource in the target measurement resource set is a second carrier;

a subcarrier spacing of a resource in the target measurement resource set is a second subcarrier spacing;

a transmission time interval of a resource in the target measurement resource set is a second transmission time interval;

a time domain range corresponding to a resource in the target measurement resource set belongs to a second time domain range; or a frequency domain range corresponding to a resource in the target measurement resource set belongs to a second frequency domain range.

In one embodiment, the first resource belongs to a first resource set, and resources in the target measurement resource set at least partially overlap with resources in the first resource set.

In one embodiment, the first resource belongs to a first resource set, the first resource set includes a common resource, and the common resource is a resource shared by the first terminal device and a second terminal device.

In one embodiment, the first indication information is corresponding to at least one of the following content:

a data priority, a service type, a destination address, data reliability, a data delay, and a quality of service flow.

According to a third aspect, a data transmission method is provided, and the method includes:

receiving, by a first terminal device, first indication information sent by a network device, where the first indication information includes at least one of the following: information used to indicate at least one carrier, information used to indicate at least one subcarrier spacing, information used to indicate at least one transmission time interval, information used to indicate a first value, information used to indicate a second value, information used to indicate a first value range, information used to indicate a first power threshold, information used to indicate a second power threshold, information used to indicate a first power range, information used to indicate a second power range, information used to indicate a first time domain range, and information used to indicate a first frequency domain range;

determining, by the first terminal device, a first resource from a first resource set according to the first indication information; and sending, by the first terminal device, first data by using the first resource.

Therefore, according to the data transmission method in this embodiment of this application, the network device sends the first indication information, so that the first terminal device (any terminal device in at least one terminal device) can determine the first resource according to the first indication information. Compared with a prior-art manner in which the first terminal device independently selects the first resource, this embodiment can reduce a case in which the first terminal device and another terminal device send data by using a same resource (in other words, reduce a resource collision probability), to implement global system optimization and improve data transmission reliability.

In one embodiment, if the first indication information includes the information used to indicate the at least one carrier, a carrier of the first resource belongs to the at least one carrier;

if the first indication information includes the information used to indicate the at least one subcarrier spacing, a subcarrier spacing of the first resource belongs to the at least one subcarrier spacing;

if the first indication information includes the information used to indicate the at least one transmission time interval, a transmission time interval of the first resource belongs to the at least one transmission time interval;

if the first indication information includes the information used to indicate the first value, a quantity of resource units of the first resource is greater than or equal to the first value;

if the first indication information includes the information used to indicate the second value, a quantity of resource units of the first resource is less than or equal to the second value;

if the first indication information includes the information used to indicate the first value range, a quantity of resource units of the first resource falls within the first value range;

if the first indication information includes the information used to indicate the first power threshold, power on the first resource is less than or equal to the first power threshold;

if the first indication information includes the information used to indicate the second power threshold, power on the first resource is greater than or equal to the second power threshold;

if the first indication information includes the information used to indicate the first power range, power on the first resource falls within the first power range;

if the first indication information includes the information used to indicate the second power range, power on the first resource falls beyond the second power range;

if the first indication information includes the information used to indicate the first time domain range, a time domain range corresponding to the first resource belongs to the first time domain range; or if the first indication information includes the information used to indicate the first frequency domain range, a frequency domain range corresponding to the first resource belongs to the first frequency domain range.

In one embodiment, the method further includes:

determining, by the first terminal device, a second resource configured by the network device for the first terminal device; and the sending, by the first terminal device, first data by using the first resource includes:

sending, by the first terminal device, the first data by using the first resource and the second resource.

Therefore, according to the data transmission method in this embodiment of this application, when interference to a resource in the first resource set is relatively strong, a resource that can be used to send the first data may be difficult to meet quality of service of the data. In this case, the first terminal device may send the first data by using the determined first resource and the second resource configured by the network device for the first terminal device, to further ensure data transmission reliability.

In one embodiment, before the receiving, by a first terminal device, first indication information sent by a network device, the method further includes:

sending, by the first terminal device, second indication information to the network device, where the second indication information is used to indicate a quantity of target resource units in a target measurement resource set that meet a second preset condition, and/or the second indication information is used to indicate a proportion of the target resource units in the target measurement resource set that meet the second preset condition in the target measurement resource set, where the second preset condition includes any one of the following:

power on the target resource unit is less than or equal to a third power threshold;

the power on the target resource unit is greater than or equal to a fourth power threshold;

the power on the target resource unit falls within a third power range; and the power on the target resource unit falls beyond a fourth power range.

Therefore, according to the data transmission method in this embodiment of this application, the first terminal device reports, to the network device, the second indication information that is used to indicate a size of a target resource unit (for example, a size and/or a proportion of the target resource unit) that meets the second preset condition in the target measurement resource set. In comparison with the prior art in which the first terminal device reports, to the network device, a specific location of a resource that meets a condition (for example, a resource with relatively weak interference or a resource with strong interference), space resources occupied by signaling can be reduced especially when a relatively large quantity of resources are reported, thereby reducing a delay caused by reporting the specific location, and improving timeliness of scheduling by the network device.

In one embodiment, a carrier of a resource in the target measurement resource set is a second carrier;

a subcarrier spacing of a resource in the target measurement resource set is a second subcarrier spacing;

a transmission time interval of a resource in the target measurement resource set is a second transmission time interval;

a time domain range corresponding to a resource in the target measurement resource set belongs to a second time domain range; or a frequency domain range corresponding to a resource in the target measurement resource set belongs to a second frequency domain range.

In one embodiment, resources in the target measurement resource set at least partially overlap with resources in the first resource set.

In one embodiment, the first resource set includes a common resource, and the common resource is a resource shared by the first terminal device and a second terminal device.

In one embodiment, the first indication information is corresponding to at least one of the following content: a data priority, a service type, a destination address, data reliability, and a data delay.

According to a fourth aspect, a data transmission method is provided, and the method includes:

determining, by a network device, first indication information, where the first indication information includes at least one of the following: information used to indicate at least one carrier, information used to indicate at least one subcarrier spacing, information used to indicate at least one transmission time interval, information used to indicate a first value, information used to indicate a second value, information used to indicate a first value range, information used to indicate a first power threshold, information used to indicate a second power threshold, information used to indicate a first power range, information used to indicate a second power range, information used to indicate a first time domain range, and information used to indicate a first frequency domain range; and sending, by the network device, the first indication information to a first terminal device.

In one embodiment, if the first indication information includes the information used to indicate the at least one carrier, a carrier of the first resource belongs to the at least one carrier;

if the first indication information includes the information used to indicate the at least one subcarrier spacing, a subcarrier spacing of the first resource belongs to the at least one subcarrier spacing;

if the first indication information includes the information used to indicate the at least one transmission time interval, a transmission time interval of the first resource belongs to the at least one transmission time interval;

if the first indication information includes the information used to indicate the first value, a quantity of resource units of the first resource is greater than or equal to the first value;

if the first indication information includes the information used to indicate the second value, a quantity of resource units of the first resource is less than or equal to the second value;

if the first indication information includes the information used to indicate the first value range, a quantity of resource units of the first resource falls within the first value range;

if the first indication information includes the information used to indicate the first power threshold, power on the first resource is less than or equal to the first power threshold;

if the first indication information includes the information used to indicate the second power threshold, power on the first resource is greater than or equal to the second power threshold;

if the first indication information includes the information used to indicate the first power range, power on the first resource falls within the first power range;

if the first indication information includes the information used to indicate the second power range, power on the first resource falls beyond the second power range;

if the first indication information includes the information used to indicate the first time domain range, a time domain range corresponding to the first resource belongs to the first time domain range; or if the first indication information includes the information used to indicate the first frequency domain range, a frequency domain range corresponding to the first resource belongs to the first frequency domain range.

In one embodiment, before the sending, by the network device, the first indication information to a first terminal device, the method further includes:

receiving, by the network device, second indication information sent by the first terminal device, where the second indication information is used to indicate a quantity of target resource units in a target measurement resource set that meet a second preset condition, and/or the second indication information is used to indicate a proportion of the target resource units in the target measurement resource set that meet the second preset condition in the target measurement resource set, where the second preset condition includes any one of the following:

power on the target resource unit is less than or equal to a third power threshold;

the power on the target resource unit is greater than or equal to a fourth power threshold;

the power on the target resource unit falls within a third power range; and the power on the target resource unit falls beyond a fourth power range.

In one embodiment, a carrier of a resource in the target measurement resource set is a second carrier;

a subcarrier spacing of a resource in the target measurement resource set is a second subcarrier spacing;

a transmission time interval of a resource in the target measurement resource set is a second transmission time interval;

a time domain range corresponding to a resource in the target measurement resource set belongs to a second time domain range; or a frequency domain range corresponding to a resource in the target measurement resource set belongs to a second frequency domain range.

In one embodiment, the first resource belongs to a first resource set, and resources in the target measurement resource set at least partially overlap with resources in the first resource set.

In one embodiment, the first resource belongs to a first resource set, the first resource set includes a common resource, and the common resource is a resource shared by the first terminal device and a second terminal device.

In one embodiment, the first indication information is corresponding to at least one of the following content: a data priority, a service type, a destination address, data reliability, a data delay, and a quality of service flow.

According to a fifth aspect, a data transmission apparatus is provided, and the apparatus may be configured to perform the operations in any one of the first aspect to the fourth aspect and any possible implementation thereof. Specifically, the apparatus may include a module or a unit configured to perform each operation in any one of the first aspect to the fourth aspect or any possible implementation thereof.

According to a sixth aspect, a signal transmission apparatus is provided, and the apparatus includes a processor, a transceiver, and a memory. The processor, the transceiver, and the memory communicate with each other by using an inner connection path. The memory is configured to store an instruction, and the processor is configured to execute the instruction stored in the memory. When the processor executes the instruction stored in the memory, the apparatus performs the method in any one of the first aspect to the fourth aspect or any possible implementation thereof.

According to a seventh aspect, a chip system is provided, including a memory and a processor. The memory is configured to store a computer program, and the processor is configured to invoke the computer program from the memory and run the computer program, so that a communications device onto which the chip system is installed performs the method in any one of the first aspect to the fourth aspect and any possible implementation thereof.

According to an eighth aspect, a computer program product is provided, and the computer program product includes computer program code. When the computer program code is run by a communications unit and a processing unit or by a transceiver and a processor of a communications device (such as a network device or a terminal device), the communications device performs the method in any one of the first aspect to the fourth aspect and any possible implementation thereof.

According to a ninth aspect, a computer readable storage medium is provided, and the computer readable storage medium stores a program. The program enables a communications device (such as a network device or a terminal device) to perform the method in any one of the first aspect to the fourth aspect and any possible implementation thereof.

According to a tenth aspect, a computer program is provided, and when the computer program is being executed on a computer, the computer implements the method in any one of the first aspect to the fourth aspect and any possible implementation thereof.

In some embodiments, the at least one carrier includes the second carrier;

the at least one subcarrier spacing includes the second subcarrier spacing;

the at least one transmission time interval includes the second transmission time interval;

the at least one time domain range includes the second time domain range; or the at least one frequency domain range includes the second frequency domain range.

In some embodiments, the first terminal device receives third indication information sent by the network device, where the third indication information is used to indicate at least one of the following:

the third power threshold, the fourth power threshold, the third power range, the fourth power range, the second carrier, the second subcarrier spacing, the second transmission time interval, the second time domain range, and the second frequency domain range.

In some embodiments, at least one of the third power threshold, the fourth power threshold, the third power range, the fourth power range, the second carrier, the second subcarrier spacing, the second transmission time interval, the second time domain range, and the second frequency domain range is corresponding to a first identifier, and the first identifier includes at least one of the following:

the data priority, the data reliability, the data delay, the service type, the destination address, and the quality of service flow.

In some embodiments, the method further includes:
determining, by the first terminal device, the first resource set.

In some embodiments, the method further includes:
receiving, by the first terminal device, fourth indication information sent by the network device, where the fourth indication information is used to indicate the first resource set; and the determining, by the first terminal device, the first resource set includes:

determining, by the first terminal device, the first resource set according to the fourth indication information.

In some embodiments, the method further includes:
receiving, by the first terminal device, fifth indication information sent by the network device, where the fifth indication information is used to indicate the second resource; and the determining, by the first terminal device, a second resource configured by the network device for the first terminal device includes:

determining, by the first terminal device, the second resource according to the fifth indication information.

In some embodiments, the fourth indication information is further used to indicate the second resource configured by the network device for the first terminal device; and the determining, by the first terminal device, a second resource configured by the network device for the first terminal device includes:

determining, by the first terminal device, the second resource according to the fourth indication information.

DESCRIPTION OF EMBODIMENTS

Figure 1:
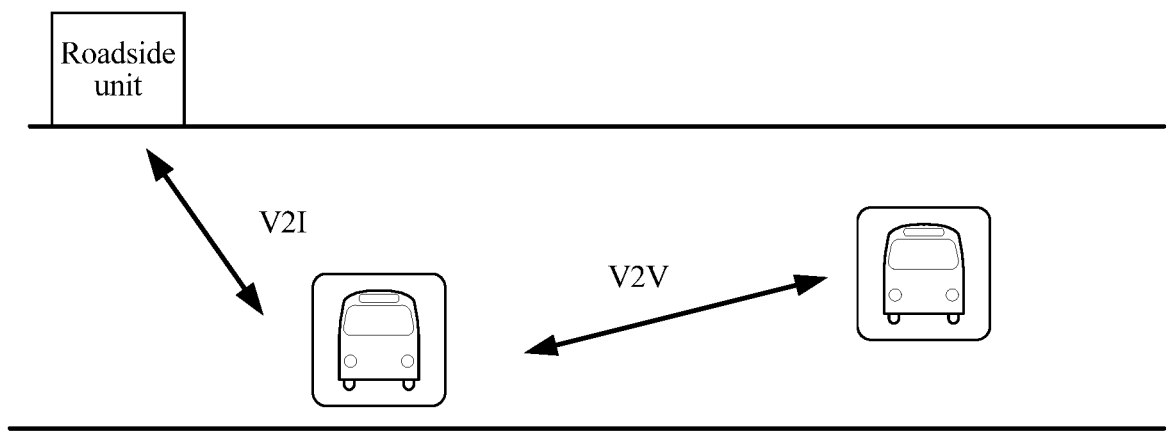
FIG. 1 is a schematic diagram of V2V communication and V2I communication in the prior art.

The following describes the technical solutions in this application with reference to the accompanying drawings.

The technical solutions in the embodiments of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, and a new radio (NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be alternatively a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network (PPLMN), or the like. This is not limited in the embodiments of this application.

A network device in the embodiments of this application may be a device for communicating with a terminal device. The network device may be a base transceiver station (BTS) in a global system for mobile communications (GSM) or code division multiple access (CDMA), or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay station, an access point, an in-vehicle device, a wearable device, a network device in a future 5G network, a network device in a future evolved PLMN network, or the like. This is not limited in the embodiments of this application.

As the society gradually develops, vehicles are becoming more popular. Driving facilitates people's travel, but also causes some adverse impact to the human society. A rapid increase in quantity of vehicles causes a series of problems such as urban traffic congestion, frequent traffic accidents, and poor environmental quality. According to statistics, in 2013, there were nearly 200,000 traffic accidents in China, resulting in 58,000 deaths and direct economic losses of 1.04 billion yuan (RMB). In consideration of personal safety, traffic efficiency, environmental protection, economic effects, and the like, a comprehensive intelligent transportation system (ITS) is required. Currently, the ITS has naturally become a global hotspot.

Currently, a vehicle may promptly obtain road condition information or receive service information through V2V, V2I, V2P, or V2N. These communication modes may be collectively referred to as V2X communication. V2V communication and V2I communication are used as a common example. FIG. 1 is a schematic diagram of V2V communication and V2I communication. As shown in FIG. 1, a vehicle may broadcast information about the vehicle such as a driving speed, a driving direction, a specific location, and abrupt deceleration to a surrounding vehicle through V2V communication, so that a driver of the surrounding vehicle can obtain the information to better learn of a traffic condition outside a line of sight, to predict a danger and further avoid the danger. For V2I communication, in addition to interaction of the foregoing security information, a roadside infrastructure such as a roadside unit (RSU) may provide various service information and data network access for the vehicle, and functions such as electronic toll collection and intra-vehicle entertainment can greatly improve traffic intelligence.

LTE is currently a mainstream wireless communications technology. Related standards are formulated for a V2X service feature and a transmission requirement, and LTE-based V2X communication is supported. In V2X communication based on an LTE system, direct link communication is one of the most important communication modes. A direct link is also referred to as a side link (Side link), and in the direct link, data to be transmitted between terminal devices may not be forwarded by a network device. The direct link communication mainly includes two transmission modes: a centralized scheduling transmission mode (may also be referred to as Mode3) and a distributed transmission mode (may also be referred to as Mode4). The following briefly describes the two transmission modes:

Centralized scheduling transmission mode (may also be referred to as Mode3): In this mode, each time before sending data, a terminal device needs to apply to a network device for a resource, and sends V2X service data based on the resource allocated by the network device. Because all resources of the terminal device are allocated by the network device, a case in which a same resource is allocated to a neighboring terminal device does not occur. In this way, the centralized transmission mode can ensure better transmission reliability. However, signaling needs to be exchanged between the terminal device and the network device each time. Therefore, in comparison with the distributed transmission mode, a transmission delay of sending data by using the centralized scheduling transmission mode is longer.

Distributed transmission mode (may also be referred to as Mode4): In this mode, in a scenario in which there is network coverage, a network device configures a resource pool for a terminal device by using a system broadcast (e.g., SIB) message or dedicated radio resource control (Dedicated RRC) signaling, and when sending V2X data, the terminal device may independently obtain at least a part of resources from the resource pool through random selection and based on a listening reservation mechanism or a partial listening reservation mechanism to send the data. In a scenario in which there is no network coverage, the terminal device independently obtains at least a part of resources from a resource pool in preconfigured information to send the data. The preconfigured information may be information that is preconfigured in the terminal when the terminal is at delivery, or may be information that is preconfigured by the network device and that is stored in the terminal. Because the terminal device independently selects a resource, a case in which different terminal devices select a same resource to send data may occur, and a transmission collision may occur.

Therefore, when different terminal devices that perform communication based on the distributed transmission mode use a same resource to send data, a transmission collision occurs, thereby reducing data transmission reliability and affecting data transmission efficiency.

In view of the above, the embodiments of this application provide a data transmission method, to resolve the foregoing problem.

The embodiments of this application may be applied to an application scenario of data transmission (namely, direct link data transmission) between two terminal devices, or may be applied to uplink data transmission between a terminal device and a network device.

Figure 2:
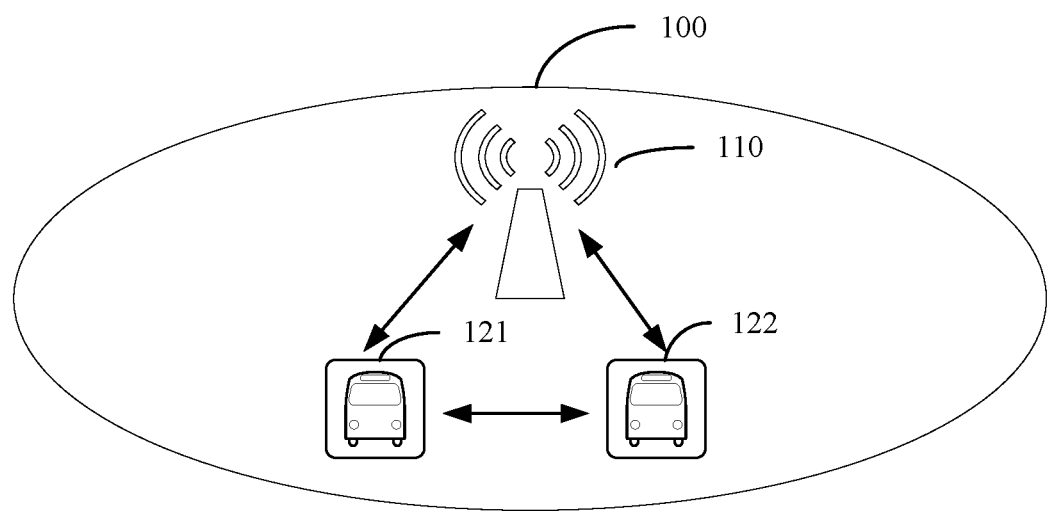
FIG. 2 is a schematic block diagram of a communications system to which an embodiment of this application is applicable.

FIG. 2 is a schematic block diagram of a communications system to which an embodiment of this application is applicable. As shown in FIG. 2, in the communications system 100, before data is transmitted, a terminal device 121 may determine, through signaling interaction with a network device 110, a resource used for transmitting the data, and then the terminal device 121 uses the determined resource to communicate with a terminal device 122. In other words, this embodiment of this application is applied to an application scenario of direct link data transmission. Alternatively, before data is transmitted, a terminal device 121 may determine, through signaling interaction with a network device 110, a resource used for transmitting the data, and then the terminal device 121 uses the determined resource to communicate with the network device 110. In other words, this embodiment of this application is applied to uplink data transmission.

It should be understood that the terminal device 122 may also determine a resource through signaling interaction with the network device 110, so that the terminal device 122 communicates with the terminal device 121 or the network device 110. This is not limited in this embodiment of this application. The signaling may be but is not limited to a SIB message or dedicated RRC signaling.

The data transmission method in the embodiments of this application is described in detail below with reference to FIG. 3 and FIG. 4.

In the embodiments of this application, a network device may perform signaling interaction with at least one terminal device, to facilitate data transmission. Generally, the data transmission method in the embodiments of this application is described in detail below by using interaction between the network device and a first terminal device as an example. It should be understood that the first terminal device may be any terminal device in the at least one terminal device. "First" is merely used for differentiation and description, and should not constitute any limitation on the embodiments of this application.

Figure 3:
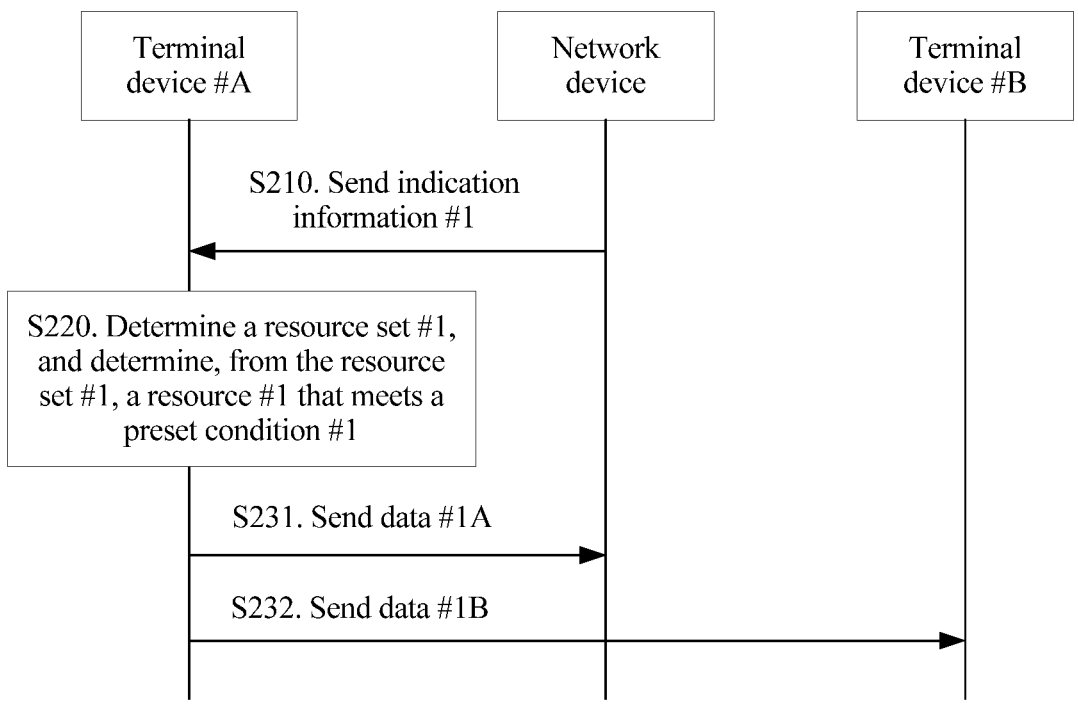
FIG. 3 is a schematic interaction diagram of a data transmission method according to an embodiment of this application.

FIG. 3 is a schematic interaction diagram of a data transmission method according to an embodiment of this application. Each operation is described in detail below.

In operation S210, a network device sends indication information #1 (an example of first indication information) to a terminal device #A (an example of a first terminal device), where the indication information #1 is used to indicate a preset condition #1 (an example of a first preset condition), and the preset condition #1 is used to determine a resource used for sending data.

Specifically, the indication information #1 may include an identifier that is directly used to indicate the preset condition #1, in other words, there is a correspondence between a preset condition and an identifier. The correspondence may be specified by a system or a protocol, or the correspondence may be notified by the network device to the terminal device #A by using signaling. Alternatively, the indication information #1 may include different types of information corresponding to the preset condition #1, and different preset conditions are corresponding to the different types of information. The preset conditions corresponding to the different types of information may be specified by a protocol or a system. In this case, after receiving the indication information #1, the terminal device #A may determine, according to the indication information #1, a condition that needs to be met by the resource used for sending data.

In one embodiment, the indication information #1 may be carried in dedicated radio resource control (RRC) signaling, or may be carried in a system broadcast information block (SIB), or may be carried in a media access control control element (MAC CE) included in a data packet sent by the network device to the terminal device, or may be carried in a downlink physical control channel sent by the network device to the terminal device, or the like. This is not limited in this embodiment of this application.

It should be understood that in this embodiment of this application, that indication information (for example, the indication information #1) is carried in dedicated RRC signaling means that the dedicated RRC signaling includes the indication information, and that the dedicated RRC signaling further includes other information is not limited in this embodiment of this application. In addition, in this embodiment of this application, a case in which the indication information is carried in a MAC CE, a SIB, a downlink physical control channel, or a measurement report is similar to the case in which the indication information is carried in the RRC signaling, and details are not described herein and subsequently.

Further, the terminal device #A receives the indication information #1. In operation S220, the terminal device #A determines, from a first resource set (an example of a first resource set) according to the indication information #1, a resource #1 (an example of a first resource) that meets the preset condition #1.

It should be understood that a resource set #1 includes several time-frequency resources, and the time-frequency resources may be used to transmit data. In one embodiment, the resource set #1 may be a resource pool.

In one embodiment, the method further includes:
the first terminal device determines the first resource set.

The terminal device #A may determine the resource set #1 according to a stipulation of a system or a protocol, or may determine the resource set #1 by using signaling.

In one embodiment, the method further includes: the resource set #1 may be carried in preconfigured information.

The preconfigured information may be information that is preconfigured in the terminal device when the terminal device is at delivery. In this case, the preconfigured information is information that is specified in a system or a protocol, so that the terminal device #A can determine the resource set #1 based on the preconfigured information.

In one embodiment, the method further includes:
the network device sends fourth indication information to the first terminal device, where the fourth indication information is used to indicate the first resource set; and
that the first terminal device determines the first resource set includes:
the first terminal device determines the first resource set according to the fourth indication information.

That is, after receiving indication information #4 (an example of the fourth indication information), the terminal device #A may determine the resource set #1 according to the indication information #4.

In one embodiment, the indication information #4 may be carried in dedicated RRC signaling, or may be carried in a SIB, or may be carried in a MAC CE included in a data packet sent by the network device to the terminal device, or may be carried in a downlink physical control channel sent by the network device to the terminal device, or may be information that is preconfigured by the network device and that is stored in the terminal device, or the like. This is not limited in this embodiment of this application.

As an example instead of a limitation, the indication information #1 may alternatively include information used to indicate the resource set #1, and this is not limited in this embodiment of this application.

It should be noted that a sequence of determining the first resource set by the first terminal device and receiving, by the first terminal device, the first indication information sent by the network device is not limited in the present application.

It should be understood that when the information used to indicate the resource set #1 and the indication information #1 are carried in same signaling, the terminal device may obtain both the information used to indicate the resource set #1 and the indication information #1 by receiving the signaling.

In operation S230, the terminal device #A sends data #1 (an example of first data) by using the resource #1.

As described above, this embodiment of this application may be applied not only to a direct link data transmission scenario, but also to an uplink data transmission scenario. Therefore, one embodiment is as follows:

In operation S231, the terminal device #A sends data #1A (another example of the first data) to the network device by using the resource #1.

In operation S232, the terminal device #A sends data #1B (still another example of the first data) to a terminal device #B (an example of a second terminal device) by using the resource #1.

In this embodiment of this application, for different terminal devices, the indication information #1 sent by the network device may indicate different preset conditions, and the terminal device may determine, based on a preset condition indicated by the indication information #1, a proper resource to send data.

In this way, compared with a prior-art manner in which the terminal device independently selects a resource, in this embodiment of this application, a manner in which a resource is determined based on a preset condition indicated by the network device can avoid a case in which different terminal devices send data by using a same resource, to implement global system optimization and improve data transmission reliability.

Therefore, according to the data transmission method in this embodiment of this application, the network device sends the first indication information that is used to indicate the first preset condition, so that the first terminal device (any terminal device in at least one terminal device) can determine the first resource based on the first preset condition indicated by the first indication information. Compared with a prior-art manner in which the first terminal device independently selects the first resource, this embodiment can reduce a case in which the first terminal device and another terminal device send data by using a same resource (in other words, reduce a resource collision probability), to implement global system optimization and improve data transmission reliability.

As described above, in this embodiment of this application, the preset condition may be indicated in two manners: In an indication manner #1, the preset condition #1 may be directly indicated by using an identifier, in other words, the indication information #1 includes an identifier of the preset condition #1, and different identifiers are corresponding to different content in the preset condition #1. In an indication manner #2, the preset condition #1 may be indirectly indicated by using different types of information, and the different types of information are corresponding to different preset conditions, where the preset conditions corresponding to the different types of information may be specified by a protocol or a system.

The foregoing two indication manners are described in detail below.

Indication Manner #1

In one embodiment, the first preset condition includes at least one of the following:

a preset condition #11: a carrier of the resource used for sending data belongs to at least one carrier;

a preset condition #12: a subcarrier spacing of the resource used for sending data belongs to at least one subcarrier spacing;

a preset condition #13: a transmission time interval of the resource used for sending data belongs to at least one transmission time interval;

a preset condition #14: a quantity of resource units of the resource used for sending data is greater than or equal to a first value;

a preset condition #15: the quantity of resource units of the resource used for sending data is less than or equal to a second value;

a preset condition #16: the quantity of resource units of the resource used for sending data falls within a first value range;

a preset condition #17: power on the resource used for sending data is less than or equal to a first power threshold;

a preset condition #18: the power on the resource used for sending data is greater than or equal to a second power threshold;

a preset condition #19: the power on the resource used for sending data falls within a first power range;

a preset condition #110: the power on the resource used for sending data falls beyond a second power range;

a preset condition #111: a time domain range corresponding to the resource used for sending data belongs to a first time domain range; and a preset condition #112: a frequency domain range corresponding to the resource used for sending data belongs to a first frequency domain range.

Specifically, the preset condition #1 may be directly indicated by using an identifier. That is, the indication information #1 includes an identifier of the preset condition #1, and different identifiers are corresponding to different content in the preset condition #1. For example, if the preset condition #1 includes only the preset condition #11, the identifier may be an identifier #1. For another example, if the preset condition #1 includes the preset condition #11 and the preset condition #12, the identifier may be an identifier #2.

The terminal device #A may obtain attribute information of a resource in the resource set #1 through listening or in another manner, and the attribute information of the resource in the resource set #1 may be information corresponding to content included in the preset condition #1. For example, the attribute information of the resource in the resource set #1 may be at least one of the following: a carrier of the resource, a subcarrier spacing of the resource, a size of the resource, power on the resource, a time domain range of the resource, and a frequency domain range of the resource.

For attributes of a same type, the resource in the resource set #1 may have a plurality of values. For example, the resource in the resource set #1 may be corresponding to at least two carriers, the resource in the resource set #1 may be corresponding to at least two subcarrier spacings, and the resource in the resource set #1 may be corresponding to at least two transmission time intervals. Examples of other types of attributes are the same as those described above, and details are not described herein again.

In this case, the terminal device #A may determine the resource #1 based on the attribute information of the resource in the resource set #1 and the preset condition #1.

If the preset condition #1 includes the preset condition #11, a carrier of the resource #1 determined by the terminal device #A from the resource set #1 belongs to the at least one carrier.

If the preset condition #1 includes the preset condition #12, a subcarrier spacing of the resource #1 determined by the terminal device #A from the resource set #1 belongs to the at least one subcarrier spacing.

If the preset condition #1 includes the preset condition #13, a transmission time interval of the resource #1 determined by the terminal device #A from the resource set #1 belongs to the at least one transmission time interval.

The at least one transmission time interval may also be understood as a maximum uplink transmission time or a maximum direct link transmission time. In this case, an uplink transmission time of the first resource selected by the terminal device #A is less than or equal to the maximum uplink transmission time, or a direct link transmission time of the first resource selected by the terminal device #A is less than or equal to the maximum direct link transmission time.

If the preset condition #1 includes the preset condition #14, a quantity of resource units of the resource #1 determined by the terminal device #A from the resource set #1 is greater than or equal to the first value. If the preset condition #1 includes the preset condition #15, the quantity of resource units of the resource #1 determined by the terminal device #A from the resource set #1 is less than or equal to the second value. If the preset condition #1 includes the preset condition #16, the quantity of resource units of the resource #1 determined by the terminal device #A from the resource set #1 falls within the first value range.

The resource unit is a unit used to indicate a resource size, and one resource unit may be one resource block (RB), one resource element (RE), one sub-channel, or the like. This is not limited in this embodiment of this application.

In specific implementation of a process in which the terminal device #A determines the resource #1 based on at least one of the preset condition #14, the preset condition #15, and the preset condition #16, the terminal device #A may preferably select a resource with relatively weak interference from the resource set #1 based on a listening result, and therefore the resource #1 may include the resource with relatively weak interference. In addition, if the terminal device #A determines the resource #1 based on the preset condition #14 and the preset condition #15, the first value is less than or equal to the second value. Likewise, if the terminal device #A determines the resource #1 based on the preset condition #14 and the preset condition #16, the first value falls within the first value range. If the terminal device #A determines the resource #1 based on the preset condition #15 and the preset condition #16, the first value falls within the first value range.

If the preset condition #1 includes the preset condition #17, power on the resource #1 determined by the terminal device #A from the resource set #1 is less than or equal to the first power threshold. If the preset condition #1 includes the preset condition #18, the power on the resource #1 determined by the terminal device #A from the resource set #1 is greater than or equal to the first power threshold. If the preset condition #1 includes the preset condition #19, the power on the resource #1 determined by the terminal device #A from the resource set #1 belongs to the first power threshold. If the preset condition #1 includes the preset condition #110, the power on the resource #1 determined by the terminal device #A from the resource set #1 falls beyond the second power range.

The power on the resource #1 represents power measured on the resource #1.

If the terminal device #A determines the resource #1 based on the preset condition #17 and the preset condition #18, the first power threshold is greater than or equal to the second power threshold. Likewise, if the terminal device #A determines the resource #1 based on the preset condition #17 and the preset condition #19, the first power threshold falls within the first power range. If the terminal device #A determines the resource #1 based on the preset condition #18 and the preset condition #19, the second power threshold value falls within the first power range. If the terminal device #A determines the resource #1 based on the preset condition #110 and at least one of the preset condition #17, the preset condition #18, and the preset condition #19, the first power threshold; the second power threshold, and the first power range all fall beyond the first power range.

It should be noted that from a perspective of the network device, in one embodiment, when the preset condition #1 includes the preset condition #18, a priority of data subsequently sent by the terminal device #A is relatively low. To ensure normal transmission of other data with a relatively high priority, resources with relatively weak interference are reserved for the data with a relatively high priority, and the terminal device #A can avoid the resources with relatively weak interference based on the preset condition #18, and select a resource based on the preset condition #18.

If the preset condition #1 includes the preset condition #111, a time domain range corresponding to the resource #1 determined by the terminal device #A from the resource set #1 belongs to the first time domain range.

If the preset condition #1 includes the preset condition #112, a frequency domain range corresponding to the resource #1 determined by the terminal device #A from the resource set #1 belongs to the first frequency domain range.

In this embodiment of this application, the preset condition #1 may include at least one of the preset condition #11 to the preset condition #112, in other words, the terminal device #A may determine the resource #1 based on a plurality of preset conditions included in the preset condition #1. For example, if the preset condition #1 includes the preset condition #15 and the preset condition #17, the quantity of resource units of the resource #1 determined by the terminal device #A based on the preset condition #1 is less than or equal to the second value, and the power on the resource #1 is less than or equal to the first power threshold. Likewise, another case is similar to this. For brevity, details are not described herein again.

Indication Manner #2

If the first preset condition includes that a carrier of the resource used for sending data belongs to at least one carrier, the first indication information includes information used to indicate the at least one carrier;

if the first preset condition includes that a subcarrier spacing of the resource used for sending data belongs to at least one subcarrier spacing, the first indication information includes information used to indicate the at least one subcarrier spacing;

if the first preset condition includes that a transmission time interval of the resource used for sending data belongs to at least one transmission time interval, the first indication information includes information used to indicate the at least one transmission time interval;

if the first preset condition includes that a quantity of resource units of the resource used for sending data is greater than or equal to a first value, the first indication information includes information used to indicate the first value;

if the first preset condition includes that a quantity of resource units of the resource used for sending data is less than or equal to a second value, the first indication information includes information used to indicate the second value;

if the first preset condition includes that a quantity of resource units of the resource used for sending data falls within a first value range, the first indication information includes information used to indicate the first value range;

if the first preset condition includes that power on the resource used for sending data is less than or equal to a first power threshold, the first indication information includes information used to indicate the first power threshold;

if the first preset condition includes that power on the resource used for sending data is greater than or equal to a second power threshold, the first indication information includes information used to indicate the second power threshold;

if the first preset condition includes that power on the resource used for sending data falls within a first power range, the first indication information includes information used to indicate the first power range;

if the first preset condition includes that power on the resource used for sending data falls beyond a second power range, the first indication information includes information used to indicate the second power range;

if the first preset condition includes that a time domain range corresponding to the resource used for sending data belongs to a first time domain range, the first indication information includes information used to indicate the first time domain range; or if the first preset condition includes that a frequency domain range corresponding to the resource used for sending data belongs to a first frequency domain range, the first indication information includes information used to indicate the first frequency domain range.

Specifically, the preset condition #1 may be indirectly indicated by using different types of information, and the different types of information are corresponding to different preset conditions. The preset conditions corresponding to the different types of information may be specified by a protocol or a system, or may be obtained according to common knowledge or well-known knowledge.

In other words, if the indication information #1 includes the information used to indicate the at least one carrier (for brevity, denoted as carrier information), content in the preset condition #1 may be indirectly indicated by using the carrier information, or the carrier information is corresponding to the preset condition #11 in the preset condition #1. If the indication information #1 includes the carrier information, after receiving the indication information #1 and obtaining the carrier information, the terminal device #A determines that the content in the corresponding preset condition #1 is that the carrier of the resource (the resource #1) used for sending data belongs to the at least one carrier, that is, the resource used for sending data is a resource on the at least one carrier. Likewise, a case in which the indication information #1 includes other information is similar to the case in which the indication information #1 includes the carrier information. For brevity, details are not described herein again.

Alternatively, the carrier information in the indication information #1 may be considered as an identifier. However, in comparison with a manner of directly identifying the preset condition #1, the carrier information may be understood as an identifier used to indirectly identify the preset condition #1.

In one embodiment, the first resource set includes a common resource, and the common resource is a resource shared by the first terminal device and the second terminal device.

In other words, the resource set #1 is a resource shared by the terminal device #A and the terminal device #B, to be specific, both the terminal device #A and the terminal device #B may obtain a resource from the resource set #1 to transmit data. FIG. 4 is a schematic diagram in which resources of the terminal device #A partially overlap with resources of the terminal device #B. In FIG. 4, the resources of the terminal device #A overlap with the resources of the terminal device #B, and resources shared by the two terminal devices are referred to as shared resources.

The resource set #1 may be all resources shared by the terminal device #A and the terminal device #B, or may be a part of all resources shared by the terminal device #A and the terminal device #B. This is not limited in this embodiment of this application.

When the resource set #1 is all resources shared by the terminal device #A and the terminal device #B, the resource set #1 includes only a common resource. In this case, both the terminal device #A and the terminal device #B may obtain a resource from the resource set #1 to transmit data.

In R14 V2X, a resource based on a centralized scheduling transmission mode (for brevity, collectively referred to as a "centralized scheduling transmission mode resource" below) and a resource based on a distributed transmission mode (for brevity, collectively referred to as a "distributed transmission mode resource" below) are totally orthogonal, and there is no intersection set between the two. In this case, a large quantity of resources in centralized scheduling transmission mode resources may be idle, but distributed transmission mode resources are already severely congested, and vice versa.

In this case, resource utilization is low. To improve resource utilization, an enhanced solution is proposed in R15, that is, centralized scheduling transmission mode resources at least partially overlap with distributed transmission mode resources. In other words, resources in the two transmission modes may totally or partially overlap.

Figure 4:
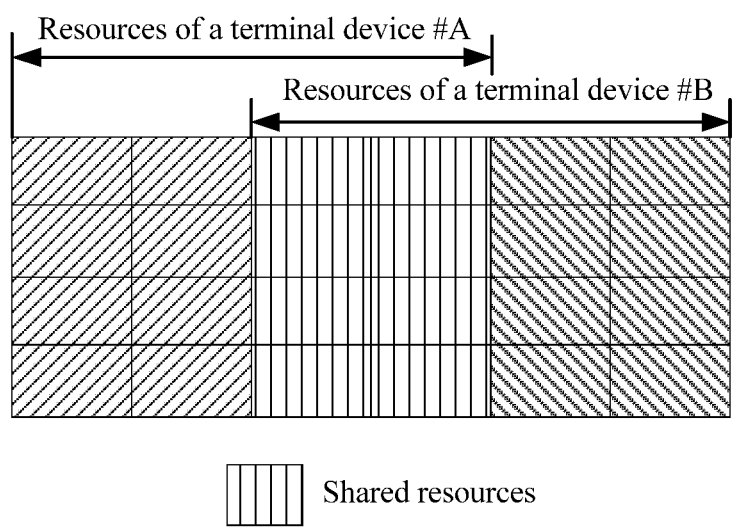
FIG. 4 is a schematic diagram in which resources of a first terminal device partially overlap with resources of a second terminal device in a data transmission method according to an embodiment of this application.

Still using FIG. 4 as an example, if the terminal device #A is a terminal device that performs communication based on the centralized scheduling transmission mode, and the terminal device #B is a terminal device that performs communication based on the distributed transmission mode, the resources of the terminal device #A are centralized scheduling transmission mode resources, the resources of the terminal device #B are distributed transmission mode resources, and a resource in the shared resources may be used by the terminal device #A that performs communication based on the centralized scheduling transmission mode or may be used by the terminal device #B that performs communication based on the distributed transmission mode.

If the distributed transmission mode resources overlap with the centralized scheduling transmission mode resources, for a resource of an overlapping part, terminal devices that use different transmission modes may occupy a same resource, or terminal devices that use a same transmission mode may occupy a same resource, resulting in a transmission collision. To avoid a transmission collision between two types of resources, in the prior art, the terminal device #A listens to usage of a resource in the shared resources, and reports the usage of the resource in the shared resources to the network device by using report information. The network device schedules a proper resource for the terminal device #1 based on the report information. For example, the terminal device #A reports, to the network device, locations of partial resources with minimal interference (or that are not occupied) in the shared resources, so that the network device can schedule a resource for the terminal device #A from the partial resources with minimal interference in the shared resources. Alternatively, the terminal device #A reports, to the network device, a location of a resource that is severely interfered with (or that is occupied) in the shared resources, so that the network device can avoid the resource that is severely interfered with in the shared resources when scheduling a resource for the terminal device #A, that is, a resource that can be used by the terminal device #A is indicated by using scheduling information. For a terminal device (the terminal device #B) based on the distributed transmission mode, the terminal device #B may determine, by measuring power on a resource in the distributed transmission mode resources, that the resource may be occupied by the terminal device #A or may be occupied by another terminal device that also uses the distributed transmission mode, so as to determine power used for sending data by the terminal device #B. It may be understood that a location of a resource herein is a time-frequency location of the resource.

However, in the prior art, the terminal device #A reports a time-frequency location of a resource with relatively weak interference or a resource with strong interference to the network device, thereby occupying relatively large signaling overheads. Consequently, system load is relatively heavy, and a process of reporting the time-frequency location of the resource results in a relatively long delay, thereby affecting timeliness of scheduling by the network device, and severely affecting timeliness of scheduling by the network device especially when the terminal device #A needs to report a relatively large quantity of resources.

To resolve the foregoing problem, this embodiment of this application provides one embodiment. Before the first terminal device receives the first indication information sent by the network device, the method further includes:

the first terminal device sends second indication information to the network device, where the second indication information is used to indicate a quantity of target resource units in a target measurement resource set that meet a second preset condition, and/or the second indication information is used to indicate a proportion of the target resource units in the target measurement resource set that meet the second preset condition in the target measurement resource set, where the second preset condition includes at least one of the following:

power on the target resource unit is less than or equal to a third power threshold;

power on the target resource unit is greater than or equal to a fourth power threshold;

power on the target resource unit falls within a third power range; or power on the target resource unit falls beyond a fourth power range.

Specifically, indication information #2 (the second indication information) may be used to indicate the quantity of target resource units and/or the proportion of the target resource units in the target resource set, so that the network device can learn of a load status of a resource in the target measurement resource set according to the indication information #2, and the network device sends the indication information #1 based on the load status of the resource in the target measurement resource set.

In one embodiment, the indication information #2 may be carried in RRC signaling, or may be carried a MAC CE, or may be carried in a measurement report sent by the terminal device #A to the network device. This is not limited in this embodiment of this application.

In one embodiment of an indication manner of a preset condition #2 (an example of the second preset condition), the network device sends third indication information to the first terminal device. The third indication information is used to indicate at least one of the following: the third power threshold, the fourth power threshold, the third power range, and the fourth power range.

That is, the terminal device #A determines content in the corresponding preset condition #2 after receiving indication information #3 (an example of the third indication information). If the indication information #3 includes the third power threshold, the terminal device #A may determine that the preset condition #2 is that the power on the target resource unit is less than or equal to the third power threshold. If the indication information #3 includes the fourth power threshold, the terminal device #A may determine that the preset condition #2 is that the power on the target resource unit is greater than or equal to the third power threshold. If the indication information #3 includes the third power range, the terminal device #A may determine that the preset condition #2 is that the power on the target resource unit falls within the third power range. If the indication information #3 includes the fourth power range, the terminal device #A may determine that the preset condition #2 is that the power on the target resource unit falls beyond the fourth power range.

It may be understood that the third power threshold, the fourth power threshold, the third power range, and the fourth power range are corresponding to a preset condition including different content. The third power threshold, the fourth power threshold, the third power range, and the fourth power range may be considered as identifiers that are used to indirectly identify the preset condition.

As an example instead of a limitation, the preset condition #2 may be directly indicated by using an identifier, that is, indication information (denoted as indication information #A for ease of differentiation and understanding) includes an identifier of the preset condition #2. Different identifiers are corresponding to different content in the preset condition #2. For example, if the preset condition #2 includes only that the power on the target resource unit is less than or equal to the third power threshold, the identifier may be an identifier #A. For another example, if the preset condition #1 includes that the power on the target resource unit is less than or equal to the third power threshold and the power on the target resource unit is greater than or equal to the fourth power threshold, the identifier may be an identifier #B.

In one embodiment, resources in the target measurement resource set at least partially overlap with resources in the first resource set.

That is, resources in the target measurement resource set totally overlap with resources in the resource set #1, or resources in the target measurement resource set partially overlap with resources in the resource set #1.

In addition, the target measurement resource set may be a part of resources in a large resource set, or may be all resources in an entire large resource set. For example, the target measurement resource set may be all resources shared by the terminal device #A and the terminal device #B shown in FIG. 4, or the target measurement resource set may be a part of all resources shared by the terminal device #A and the terminal device #B shown in FIG. 4.

After receiving the indication information #3 or the indication information #A, the terminal device #A measures power on a resource in the target measurement resource set, selects the target resource unit that meets the preset condition #2, and reports the quantity of target resource units and/or the proportion of the target resource units in the target measurement resource set to the network device by using the indication information #2. The network device may send the indication information #1 according to the indication information #2.

For example, if the network device deems, by using the indication information #2, that overall interference to a resource in the target measurement resource set is relatively weak, it may indicate that power of a resource used by the terminal device #A is relatively low, and therefore the preset condition #1 may include the preset condition #17, or it may indicate that a size of a resource used by the terminal device #A is relatively small (because the overall interference to the resource in the target measurement resource set is relatively weak, transmission reliability can also be ensured by using a resource whose size is relatively small to send data), and therefore the preset condition #1 may include the preset condition #15. For another example, if the terminal device deems, by using the indication information #2, that overall interference to a resource in the target measurement resource set is relatively strong, and a priority of data subsequently sent by the terminal device #A is relatively low, to ensure transmission of other data with a relatively high priority, the terminal device #A may be instructed to send data by using a resource with relatively high power, and therefore the preset condition #1 may include the preset condition #18; or it may indicate that a size of a resource used by the terminal device #A is relatively large, and therefore the preset condition #1 may include the preset condition #14.

It should be understood that the foregoing is merely an example, and should not constitute a limitation on this embodiment of this application. Any solution that can be logically implemented falls within the protection scope of this application.

In addition, the first power threshold may be the same as or may be different from the third power threshold, the second power threshold may be the same as or may be different from the fourth power threshold, the first power range may be the same as or may be different from the third power range, and the second power range may be the same as or may be different from the fourth power range. This is not limited in this embodiment of this application.

Therefore, according to the data transmission method in this embodiment of this application, the first terminal device reports, to the network device, the second indication information that is used to indicate a size of a target resource unit (for example, a size and/or a proportion of the target resource unit) that meets the second preset condition in the target measurement resource set. In comparison with the prior art in which the first terminal device reports, to the network device, a specific location of a resource that meets a condition (for example, a resource with relatively weak interference or a resource with strong interference), space resources occupied by signaling can be reduced especially when a relatively large quantity of resources are reported, thereby reducing a delay caused by reporting the specific location, and improving timeliness of scheduling by the network device.

The target measurement resource set may be a resource set specified by a system or a protocol, or may be a resource set that is notified by the network device to the terminal device #A by using signaling. This is not limited in this embodiment of this application. For example, in one embodiment, the network device sends indication information #C1 to the terminal device #A, where the indication information #C1 is used to indicate the target measurement resource set. Specifically, the indication information #C1 may include an identifier corresponding to the target measurement resource set, and the terminal device #A determines the target measurement resource set based on the identifier corresponding to the target measurement resource set. In one embodiment, the target measurement resource set meets at least one of the following conditions:

a carrier of a resource in the target measurement resource set is a second carrier;

a subcarrier spacing of a resource in the target measurement resource set is a second subcarrier spacing;

a transmission time interval of a resource in the target measurement resource set is a second transmission time interval;

a time domain range corresponding to a resource in the target measurement resource set belongs to a second time domain range; or a frequency domain range corresponding to a resource in the target measurement resource set belongs to a second frequency domain range.

Specifically, when the carrier of the resource in the target measurement resource set is the second carrier, the preset condition #1 may include the preset condition #11 or may not include the preset condition #11. When the subcarrier spacing of the resource in the target measurement resource set is the second subcarrier spacing, the preset condition #1 may include the preset condition #12 or may not include the preset condition #12. When the transmission time interval of the resource in the target measurement resource set is the second transmission time interval, the preset condition #1 may include the preset condition #13 or may not include the preset condition #13. When the time domain range corresponding to the resource in the target measurement resource set belongs to the second time domain range, the preset condition #1 may include the preset condition #111 or may not include the preset condition #111. When the frequency domain range of the resource in the target measurement resource set belongs to the second frequency domain range, the preset condition #1 may include the preset condition #112 or may not include the preset condition #112.

When the network device communicates with a plurality of terminal devices, the network device needs to send, to each terminal device, the indication information #1 that is used to indicate the preset condition #1, but some terminal devices may not have a listening and measurement function. Alternatively, to reduce signaling overheads, a load status of a resource in the target measurement resource set is measured and reported by using only one terminal device (for example, the terminal device #A). The network device may send the indication information #1 based on the load status of the resource in the target measurement resource set.

The preset condition #1 in the indication information #1 sent by the network device is described by using an example in which the carrier of the resource in the target measurement resource set is the second carrier. When the carrier of the resource in the target measurement resource set is the second carrier, if the preset condition #1 includes the preset condition #11, the second carrier may belong to the at least one carrier; or if the preset condition #1 does not include the preset condition #11, it indicates that the terminal device #A measures the target measurement resource set for another terminal device, and the network device may send the preset condition to the another terminal device. In addition, the second carrier belongs to the at least one carrier.

Likewise, a process of sending the indication information #1 by the network device in a case in which the target resource set meets another condition is similar to that in a case in which the resource in the target measurement resource set belongs to the second carrier. For brevity, details are not described herein again.

In one embodiment, the at least one carrier includes the second carrier;

the at least one subcarrier spacing includes the second subcarrier spacing;

the at least one transmission time interval includes the second transmission time interval;

the at least one time domain range includes the second time domain range; or the at least one frequency domain range includes the second frequency domain range.

Using a carrier as an example, when the at least one carrier includes the second carrier, a carrier in the at least one carrier except the second carrier may be a condition that a resource in a resource set measured by the another terminal device based on an instruction of the network device meets. It may be understood that, the network device may measure, by using a plurality of terminal devices, resources that meet different carrier conditions (for example, a carrier of a resource in a target measurement resource set measured by the terminal device #A is the second carrier, and a carrier of a resource in a target measurement resource set measured by the terminal device #B is a third carrier). The network device may send the indication information #1 to the terminal device #A based on carriers of resources in target measurement resource sets measured by different terminal devices, so that a carrier of a resource that can be selected by the terminal device #A may be not only the second carrier, but also a carrier other than the second carrier.

A relationship between the at least one subcarrier spacing and the second subcarrier spacing, a relationship between the at least one transmission time interval and the second transmission time interval, a relationship between the at least one time domain range and the second time domain range, and a relationship between the at least one frequency domain range and the second frequency domain range are similar to a relationship between the at least one carrier and the second carrier. For brevity, details are not described again.

In this embodiment of this application, a target measurement resource set indicated by the network device by using indication information (denoted as indication information #C2 for ease of differentiation and understanding) or a target measurement resource set specified by a system or a protocol meets the foregoing condition. The terminal device #A may determine the target measurement resource set according to only the indication information #C2.

Alternatively, the network device indicates the target measurement resource set by using a second resource set indicated by indication information (denoted as indication information #C3 for ease of differentiation and understanding) and according to other indication information (denoted as indication information #C4 for ease of differentiation and understanding). The indication information #C4 includes at least one of information used to indicate the second carrier, information used to indicate the second subcarrier spacing, information used to indicate the second transmission time interval, information used to indicate the second time domain range, and information used to indicate the second frequency domain range. The terminal device #A needs to determine the target measurement resource set according to both the indication information #C3 and the indication information #C4.

For example, the second resource set indicated by the indication information #C3 includes resources with two different subcarrier spacings, the two subcarrier spacings are 15 kHz and 120 kHz, and a second subcarrier spacing indicated by the indication information #C4 is 15 kHz. In this case, a subcarrier spacing of a resource in the target measurement resource set determined by the terminal device #A according to the indication information #C3 and the indication information #C4 is 15 kHz. Certainly, it may be understood that the indication information #C3 and the indication information #C4 may be carried in same signaling, or may be carried in different signaling. This is not limited in the present application.

In one embodiment, there is a first correspondence between a first identifier and at least one of the third power threshold, the fourth power threshold, the third power range, the fourth power range, the second carrier, the second subcarrier spacing, the second transmission time interval, the second time domain range, and the second frequency domain range, and therefore a load status of a resource in the target measurement resource set can be more accurately obtained. The first identifier includes at least one of the following: a data priority, data reliability, a data delay, a service type, a destination address, and a quality of service flow.

Herein, the correspondence includes a correspondence (denoted as a correspondence #A1 for ease of differentiation and understanding) between the data priority and the at least one of the third power threshold, the fourth power threshold, the third power range, the fourth power range, the second carrier, the second subcarrier spacing, the second transmission time interval, the second time domain range, and the second frequency domain range. The correspondence includes a correspondence (denoted as a correspondence #A2 for ease of differentiation and understanding) between the data reliability and the at least one of the foregoing. The correspondence includes a correspondence (denoted as a correspondence #A3 for ease of differentiation and understanding) between the data delay and the at least one of the foregoing. The correspondence includes a correspondence (denoted as a correspondence #A4 for ease of differentiation and understanding) between the service type and the at least one of the foregoing. The correspondence includes a correspondence (denoted as a correspondence #A5 for ease of differentiation and understanding) between the destination address and the at least one of the foregoing. The correspondence includes a correspondence (denoted as a correspondence #A6 for ease of differentiation and understanding) between the quality of service flow and the at least one of the foregoing.

In an optional embodiment, the network device sends, to the terminal device #A, indication information (denoted as indication information #D for ease of differentiation and understanding) used to indicate the correspondence.

Further, the terminal device #A may obtain the correspondence according to the indication information #D, determine, based on the correspondence, the load status of the resource in the target measurement resource set in the case of the at least one of the data priority, the data reliability, the data delay, the service type, the destination address, and the quality of service flow, and then send the indication information #2.

The indication information #D may be carried in preconfigured information, or may be carried in dedicated RRC signaling, or may be carried in a SIB.

In addition, the preconfigured information may be information that is preconfigured in the terminal device when the terminal device is at delivery, or may be information that is preconfigured by a network and that is stored in the terminal device.

In an optional embodiment, the target measurement resource set belongs to a resource set #2, and the resource set #2 may be the same as or different from the first resource set. Information used to indicate the resource set #2 may be carried in preconfigured information, or may be carried in dedicated RRC signaling, or may be carried in a SIB. The preconfigured information may be information that is preconfigured in the terminal device when the terminal is at delivery, or may be information that is configured by a network and that is stored in the terminal.

The following separately describes this embodiment of this application by using a correspondence between the at least one of the third power threshold, the fourth power threshold, the third power range, the fourth power range, the second carrier, the second subcarrier spacing, the second transmission time interval, the second time domain range, and the second frequency domain range and each of the data priority, the data reliability, the data delay, the service type, the destination address, and the quality of service flow.

Data Priority

In terms of data priority, data with different priorities usually has different resource requirements (including different resource feature requirements). Therefore, there may be the correspondence #A1 between the data priority and the at least one of the third power threshold, the fourth power threshold, the third power range, the fourth power range, the second carrier, the second subcarrier spacing, the second transmission time interval, the second time domain range, and the second frequency domain range.

Using the third power threshold as an example, the network device may configure a correspondence (denoted as a correspondence #A11 for ease of differentiation and understanding) between the data priority and the third power threshold. The terminal device #A determines a corresponding third power threshold based on a priority of to-be-sent data and the correspondence #A11, then determines a resource whose power is less than or equal to the third power threshold in the target resource set, and sends the indication information #2 to the network device.

Using the third power threshold as an example, if a priority (denoted as a data priority #1 for ease of differentiation and understanding) of data (for example, the data #1) to be sent by the terminal device is higher, a third power threshold (denoted as a power threshold #31 for ease of differentiation and understanding) corresponding to the data priority #1 is lower, and the target resource unit is a resource unit that meets the power threshold #31. In this case, content in the preset condition #1 in the indication information #1 sent by the network device is associated with the data priority #1, so that the terminal device #A can select the more proper resource #1.

Data Reliability

Data reliability may reflect a reliability degree of data transmission. In one embodiment, the reliability degree may be represented by using a packet loss rate. A smaller packet loss rate indicates a higher reliability degree.

In terms of data reliability, different data usually has different reliability requirements and different resource requirements (including different resource feature requirements). Therefore, there may be a correspondence between the data reliability and the at least one of the third power threshold, the fourth power threshold, the third power range, the fourth power range, the second carrier, the second subcarrier spacing, the second transmission time interval, the second time domain range, and the second frequency domain range, namely, the correspondence #A2.

Using the second subcarrier spacing and the third power threshold as an example, the network device may configure a correspondence (denoted as a correspondence #A21 for ease of differentiation and understanding) between the data reliability and both the second subcarrier spacing and the third power threshold. The terminal device #A may determine a target measurement resource set from the second resource set based on the correspondence #A21 and reliability of to-be-sent data. A subcarrier spacing of a resource in the target measurement resource set is the second subcarrier spacing, and in the target measurement resource set, a measurement threshold is the third power threshold. Then the terminal device #A sends the indication information #2 to the network device.

For example, if reliability (denoted as data reliability #1 for ease of differentiation and understanding) of data (for example, the data #1) to be sent by the terminal device #A is higher, a third power threshold (denoted as a power threshold #32 for ease of differentiation and understanding) corresponding to the data reliability #1 is lower, and a second subcarrier spacing (denoted as a subcarrier spacing #22 for ease of differentiation and understanding) corresponding to the data reliability #1 is larger. The target measurement resource set includes a resource unit that meets the subcarrier spacing #22 in the second resource set, and the target resource unit is a resource unit whose power meets the power threshold #32 in the target measurement resource set. In this case, content in the preset condition #1 in the indication information #1 sent by the network device is associated with the data reliability #1, so that the terminal device #A can select the more proper resource #1.

Data Delay

There is a specific association between a data delay and data reliability. Usually, the data reliability is also data transmission reliability within a period of time, and the data delay is a data delay in a condition in which specified data transmission reliability is ensured. Generally, in a same comparison condition, for example, in a same reliability condition, if a data delay is shorter, a required third power threshold is lower. In addition, the data delay may be but is not limited to an end-to-end delay, an air interface transmission delay, a maximum uplink transmission delay, a maximum direct link transmission delay, and the like.

In terms of data delay, different data usually has different delay requirements and different resource requirements (including different resource feature requirements). Therefore, there may be a correspondence between the data delay and the at least one of the third power threshold, the fourth power threshold, the third power range, the fourth power range, the second carrier, the second subcarrier spacing, the second transmission time interval, the second time domain range, and the second frequency domain range, namely, the correspondence #A3.

Using the second transmission time interval and the third power threshold as an example, the network device may configure a correspondence (denoted as a correspondence #A31 for ease of differentiation and understanding) between the data delay and both the second transmission time interval and the third power threshold. The terminal device #A may determine a target measurement resource set from the second resource set based on a delay of to-be-sent data and the correspondence #A31. A transmission time interval of a resource in the target measurement resource set is the second transmission time interval, and in the target measurement resource set, a measurement threshold is the third power threshold. Then the terminal device #A sends the indication information #2 to the network device.

For example, if a delay (denoted as a data delay #1 for ease of differentiation and understanding) of data (for example, the data #1) to be sent by the terminal device #A is shorter, a third power threshold (denoted as a power threshold #33 for ease of differentiation and understanding) corresponding to the data delay #1 is lower, and a second transmission time interval (denoted as a transmission time interval #23 for ease of differentiation and understanding) corresponding to the data delay #1 is smaller. The target measurement resource set includes a resource unit that meets the transmission time interval #23 in the second resource set, and the target resource unit is a resource unit whose power meets the power threshold #33 in the target measurement resource set. In this case, content in the preset condition #1 in the indication information #1 sent by the network device is associated with the data delay #1, so that the terminal device #A can select the more proper resource #1.

Service Type

Data service types may be services corresponding to different receive ends. For example, different types of services may be a V2V service, a V2P service, and a V2I service. Alternatively, data service types may be differentiated by using an application layer identifier (Application Identifier, AID, or Provider Service Identifier, PSID) carried by an application layer. For example, different application layer identifiers may represent different services. For example, an AID1 may indicate a collision warning service, and an AID2 may indicate an abnormal vehicle status alarm.

In terms of service type, different data usually has different delay requirements and different resource requirements (including different resource feature requirements). Therefore, there may be a correspondence between the service type and the at least one of the third power threshold, the fourth power threshold, the third power range, the fourth power range, the second carrier, the second subcarrier spacing, the second transmission time interval, the second time domain range, and the second frequency domain range, namely, the correspondence #A4.

Using the second transmission time interval, the second subcarrier spacing, and the third power threshold as an example, the network device may configure a correspondence (denoted as a correspondence #A41 for ease of differentiation and understanding) between the service type and the second transmission time interval, the second subcarrier spacing, and the third power threshold. The terminal device #A may determine a target measurement resource set from the second resource set based on a service type of to-be-sent data and the correspondence #A41. A transmission time interval of a resource in the target measurement resource set is the second transmission time interval, a subcarrier spacing of the resource in the target measurement resource set is the second subcarrier spacing, and in the target measurement resource set, a measurement threshold is the third power threshold. Then the terminal device #A may send the indication information #2 to the network device.

For example, if a service type (denoted as a service type #1 for ease of differentiation and understanding) of data (for example, the data #1) to be sent by the terminal device #A is a collision warning service, a third power threshold (denoted as a power threshold #34 for ease of differentiation and understanding) corresponding to the service type #1 is relatively low, a second transmission time interval (denoted as a transmission time interval #24 for ease of differentiation and understanding) corresponding to the service type #1 is relatively small, and a second subcarrier spacing (denoted as a subcarrier spacing #24 for ease of differentiation and understanding) corresponding to the service type #1 is relatively large. The target measurement resource set includes a resource unit that meets the transmission time interval #24 and the subcarrier spacing #24 in the second resource set, and the target resource unit is a resource unit whose power meets the power threshold #34 in the target measurement resource set. In this case, content in the preset condition #1 in the indication information #1 sent by the network device is associated with the service type #1, so that the terminal device #A can select the more proper resource #1.

Destination Address

The destination address may be a multicast address, a unicast address, or a broadcast address. In terms of unicast address, different unicast addresses may be corresponding to different receive ends, for example, the network device or the terminal device #B. Different multicast addresses may be corresponding to different groups.

In terms of destination address, different destination addresses are corresponding to different receive ends, and therefore usually have different resource requirements (including different resource feature requirements). Therefore, there may be a correspondence between the destination address and the at least one of the third power threshold, the fourth power threshold, the third power range, the fourth power range, the second carrier, the second subcarrier spacing, the second transmission time interval, the second time domain range, and the second frequency domain range, namely, the correspondence #A5.

Using the second transmission time interval, the second subcarrier spacing, and the third power threshold as an example, the network device may configure a correspondence (denoted as a correspondence #A51 for ease of differentiation and understanding) between the destination address and the second transmission time interval, the second subcarrier spacing, and the third power threshold. The terminal device #A may determine a target measurement resource set from the second resource set based on a destination address of to-be-sent data and the correspondence #A51. A transmission time interval of a resource in the target measurement resource set is the second transmission time interval, a subcarrier spacing of the resource is the second subcarrier spacing, and in the target measurement resource set, a measurement threshold is the third power threshold. Then the terminal device #A may send the indication information #2 to the network device.

For example, if a destination address (denoted as a destination address #1 for ease of differentiation and understanding) of data (for example, the data #1) to be sent by the terminal device is the network device, a third power threshold (denoted as a power threshold #35 for ease of differentiation and understanding) corresponding to the destination address #1 is relatively low, a second transmission time interval (denoted as a transmission time interval #25 for ease of differentiation and understanding) corresponding to the destination address #1 is relatively small, and a second subcarrier spacing (denoted as a subcarrier spacing #25 for ease of differentiation and understanding) corresponding to the destination address #1 is relatively large. The target measurement resource set includes a resource unit that meets the transmission time interval #25 and the subcarrier spacing #25 in the second resource set, and the target resource unit is a resource unit whose power meets the power threshold #35 in the target measurement resource set. In this case, content in the preset condition #1 in the indication information #1 sent by the network device is associated with the destination address #1, so that the terminal device #A can select the more proper resource #1.

Quality of Service Flow

Data having different quality of service (QoS) is usually divided into different quality of service flows (QoS flow), and is differentiated by using different QoS flow identifiers. A QoS parameter may include but is not limited to at least one of a data delay, data reliability, a maximum rate, a data priority, a data type, and a service type. A core network device or the network device may configure or preconfigure a mapping relationship between a QoS flow identifier and a QoS parameter on the terminal device. In this way, the terminal device can obtain, based on a QoS flow identifier, QoS corresponding to data.

In terms of quality of service flow, different quality of service flows usually mean that data has different QoS, and the different quality of service flows usually have different resource requirements (including different resource feature requirements). Therefore, there may be a correspondence between the quality of service flow and the at least one of the third power threshold, the fourth power threshold, the third power range, the fourth power range, the second carrier, the second subcarrier spacing, the second transmission time interval, the second time domain range, and the second frequency domain range, namely, the correspondence #A6.

Using the second transmission time interval, the second subcarrier spacing, and the third power threshold as an example, the network device may configure a correspondence (denoted as a correspondence #A61 for ease of differentiation and understanding) between the quality of service flow and the second transmission time interval, the second subcarrier spacing, and the third power threshold. The terminal device #A may determine a target measurement resource set from the second resource set based on a quality of service flow of to-be-sent data and the correspondence #A61. A transmission time interval of a resource in the target measurement resource set is the second transmission time interval, a subcarrier spacing of the resource in the target measurement resource set is the second subcarrier spacing, and in the target measurement resource set, a measurement threshold is the third power threshold. Then the terminal device #A may send the indication information #2 to the network device.

For example, if a quality of service flow identifier (denoted as a quality of service flow identifier #1 for ease of differentiation and understanding) of data (for example, the data #1) to be sent by the terminal device #A is a quality of service flow identifier #1, a third power threshold (denoted as a power threshold #36 for ease of differentiation and understanding) corresponding to the quality of service flow identifier #1 is relatively low, a second transmission time interval (denoted as a transmission time interval #26 for ease of differentiation and understanding) corresponding to the quality of service flow identifier #1 is relatively small, and a second subcarrier spacing (denoted as a subcarrier spacing #26 for ease of differentiation and understanding) corresponding to the quality of service flow identifier #1 is relatively large. The target measurement resource set includes a resource unit that meets the transmission time interval #26 and the subcarrier spacing #26 in the second resource set, and the target resource unit is a resource unit whose power meets the power threshold #36 in the target measurement resource set. In this case, content in the preset condition #1 in the indication information #1 sent by the network device is associated with the quality of service flow identifier, so that the terminal device #A can select the more proper resource #1.

In one embodiment, the first indication information is corresponding to at least one of the following content:

a data priority, a service type, a destination address, data reliability, a data delay, and a quality of service flow. In other words, there is a correspondence (denoted as a correspondence #B for ease of differentiation and understanding) between the at least one of the content and the preset condition #1. Each correspondence is described below.

When there is a correspondence (denoted as a correspondence #B1 for ease of differentiation and understanding) between the data priority and the preset condition #1, the terminal device A determines, based on a data priority of to-be-sent data and the correspondence #B1, content included in the corresponding preset condition #1, and determines the resource #1 based on the content included in the preset condition #1. It may be understood that, if the data priority is higher, interference to the resource #1 determined based on the content included in the corresponding preset condition #1 is weaker, thereby ensuring transmission reliability of data with a higher priority. Likewise, if the data priority is lower, interference to the resource #1 determined by the terminal device #A based on the content included in the preset condition #1 is stronger. In this way, a resource with relatively weak interference can also be reserved for data with a relatively high priority, thereby ensuring overall data transmission reliability. Specifically, a specific parameter in at least one preset condition included in the preset condition #1 may be determined based on an actual situation, and details are not described herein.

When there is a correspondence (denoted as a correspondence #B2 for ease of differentiation and understanding) between the service type and the preset condition #1, the terminal device A determines, based on a service type of to-be-sent data and the correspondence #B2, content included in the corresponding preset condition #1, and determines the resource #1 based on the content included in the preset condition #1. It may be understood that for different service types, the resource #1 determined based on the correspondence #B2 and the content included in the corresponding preset condition #1 varies. Therefore, data transmission reliability is ensured for a relatively urgent service.

When there is a correspondence (denoted as a correspondence #B3 for ease of differentiation and understanding) between the destination address and the preset condition #1, the terminal device A determines, based on a destination address of to-be-sent data and the correspondence #B3, content included in the corresponding preset condition #1, and determines the resource #1 based on the content included in the preset condition #1. It may be understood that for different destination addresses, the resource #1 determined based on the correspondence #B3 and the content included in the corresponding preset condition #1 varies.

When there is a correspondence (denoted as a correspondence #B4 for ease of differentiation and understanding) between the data reliability and the preset condition #1, the terminal device A determines, based on data reliability of to-be-sent data and the correspondence #B4, content included in the corresponding preset condition #1, and determines the resource #1 based on the content included in the preset condition #1. It may be understood that for different data reliability, the resource #1 determined based on the correspondence #B4 and the content included in the corresponding preset condition #1 varies. In addition, for data with relatively high data reliability, interference to the resource #1 determined based on the corresponding preset condition #1 is weak, and a subcarrier spacing is relatively large, thereby ensuring data transmission reliability.

When there is a correspondence (denoted as a correspondence #B5 for ease of differentiation and understanding) between the data delay and the preset condition #1, the terminal device A determines, based on a data delay of to-be-sent data and the correspondence #B5, content included in the corresponding preset condition #1, and determines the resource #1 based on the content included in the preset condition #1. It may be understood that for data having different data delay requirements, the resource #1 determined based on the correspondence #B5 and the content included in the corresponding preset condition #1 varies. For data having a relatively low data requirement, interference to the resource #1 determined based on the corresponding preset condition #1 is weak, and a time interval is relatively small, thereby ensuring a data transmission delay requirement.

When there is a correspondence (denoted as a correspondence #B6 for ease of differentiation and understanding) between the quality of service flow and the preset condition #1, the terminal device A determines, based on a quality of service flow identifier of to-be-sent data and the correspondence #B6, content included in the corresponding preset condition #1, and determines the resource #1 based on the content included in the preset condition #1. It may be understood that for different quality of service flow identifiers, the resource #1 determined based on the content included in the corresponding preset condition #1 varies. In this way, transmission reliability, a transmission delay, a data rate, and the like of data having a relatively high QoS requirement can be ensured. Specifically, a specific parameter in at least one preset condition included in the preset condition #1 may be determined based on an actual situation, and details are not described herein.

In one embodiment, a correspondence between the first indication information and the at least one of the data priority, the service type, the destination address, the data reliability, the data delay, and the quality of service flow may be configured by the network device.

In one embodiment, a correspondence between the first indication information and the at least one of the data priority, the service type, the destination address, the data reliability, the data delay, and the quality of service flow may be carried in preconfigured information, or may be carried in dedicated RRC signaling, or may be carried in a SIB.

This embodiment of this application further provides another optional implementation, and the method further includes:

the first terminal device determines a second resource configured by the network device for the first terminal device; and that the first terminal device sends first data by using the first resource includes:

the first terminal device sends the first data by using the first resource and the second resource.

Specifically, a resource #2 (the second resource) is a resource configured by the network device for the terminal device #A, and the network device may configure the resource #2 for the terminal device #A by using a system or a protocol or signaling. The terminal device #A may send the data #1 by using the resource #1 determined according to the indication information #1 and the resource #2.

When interference to a resource in the resource set #1 is relatively strong, a resource that can be used to send the data #1 may be difficult to meet quality of service for information sending. In this case, the terminal device #A may send the data #1 by using the determined resource #1 and the resource #2, to further ensure data transmission reliability.

In one embodiment, the network device sends fifth indication information, where the fifth indication information is used to indicate the second resource; and that the first terminal device determines a second resource configured by the network device for the first terminal device includes:

the first terminal device determines the second resource according to the fifth indication information.

In this way, the terminal device #A may determine the resource #2 according to the fifth indication information.

As an example instead of a limitation, the fourth indication information is further used to indicate the resource #2.

In this way, the terminal device #A can not only determine the resource set #1 but also determine the resource #1 according to the fourth indication information.

Therefore, according to the data transmission method provided in this embodiment of this application, the network device sends the first indication information that is used to indicate the first preset condition, so that the first terminal device (any terminal device in at least one terminal device) can determine the first resource based on the first preset condition indicated by the first indication information. Compared with a prior-art manner in which the first terminal device independently selects the first resource, this embodiment can reduce a case in which the first terminal device and another terminal device send data by using a same resource (in other words, reduce a resource collision probability), to implement global system optimization and improve data transmission reliability.

Further, when interference to a resource in the first resource set is relatively strong, a resource that can be used to send the first data may be difficult to meet quality of service of the data. In this case, the first terminal device may send the first data by using the determined first resource and the second resource configured by the network device for the first terminal device, to further ensure data transmission reliability.

Still further, the first terminal device reports, to the network device, the second indication information that is used to indicate a size of a target resource unit (for example, a size and/or a proportion of the target resource unit) that meets the second preset condition in the target measurement resource set. In comparison with the prior art in which the first terminal device reports, to the network device, a specific location of a resource that meets a condition (for example, a resource with relatively weak interference or a resource with strong interference), space resources occupied by signaling can be reduced especially when a relatively large quantity of resources are reported, thereby reducing a delay caused by reporting the specific location, and improving timeliness of scheduling by the network device.

An embodiment of this application further provides a data transmission method 300, and the method 300 includes the following operations.

In operation S310, a network device sends first indication information to a first terminal device, where the first indication information includes at least one of the following: information used to indicate at least one carrier, information used to indicate at least one subcarrier spacing, information used to indicate at least one transmission time interval, information used to indicate a first value, information used to indicate a second value, information used to indicate a first value range, information used to indicate a first power threshold, information used to indicate a second power threshold, information used to indicate a first power range, information used to indicate a second power range, information used to indicate a first time domain range, and information used to indicate a first frequency domain range.

In addition, in operation S310, the first terminal device receives the first indication information.

In operation S320, the first terminal device determines a first resource from a first resource set according to the first indication information.

In operation S330, the first terminal device sends first data by using the first resource.

In this way, the network device sends the first indication information, so that the first terminal device (any terminal device in at least one terminal device) can determine the first resource according to the first indication information. Compared with a prior-art manner in which the first terminal device independently selects the first resource, this embodiment can reduce a case in which the first terminal device and another terminal device send data by using a same resource (in other words, reduce a resource collision probability), to implement global system optimization and improve data transmission reliability.

In one embodiment, if the first indication information includes the information used to indicate the at least one carrier, a carrier of the first resource belongs to the at least one carrier;

if the first indication information includes the information used to indicate the at least one subcarrier spacing, a subcarrier spacing of the first resource belongs to the at least one subcarrier spacing;

if the first indication information includes the information used to indicate the at least one transmission time interval, a transmission time interval of the first resource belongs to the at least one transmission time interval;

if the first indication information includes the information used to indicate the first value, a quantity of resource units of the first resource is greater than or equal to the first value;

if the first indication information includes the information used to indicate the second value, a quantity of resource units of the first resource is less than or equal to the second value;

if the first indication information includes the information used to indicate the first value range, a quantity of resource units of the first resource falls within the first value range;

if the first indication information includes the information used to indicate the first power threshold, power on the first resource is less than or equal to the first power threshold;

if the first indication information includes the information used to indicate the second power threshold, power on the first resource is greater than or equal to the second power threshold;

if the first indication information includes the information used to indicate the first power range, power on the first resource falls within the first power range;

if the first indication information includes the information used to indicate the second power range, power on the first resource falls beyond the second power range;

if the first indication information includes the information used to indicate the first time domain range, a time domain range corresponding to the first resource belongs to the first time domain range; or if the first indication information includes the information used to indicate the first frequency domain range, a frequency domain range corresponding to the first resource belongs to the first frequency domain range.

For descriptions of content in each of at least one piece of information included in the first indication information and the corresponding first resource, refer to the foregoing related descriptions. For brevity, details are not described herein again.

In one embodiment, the method further includes:

the first terminal device determines a second resource configured by the network device for the first terminal device; and that the first terminal device sends first data by using the first resource includes:

the first terminal device sends the first data by using the first resource and the second resource.

Therefore, according to the data transmission method in this embodiment of this application, when interference to a resource in the first resource set is relatively strong, a resource that can be used to send the first data may be difficult to meet quality of service of the data. In this case, the first terminal device may send the first data by using the determined first resource and the second resource configured by the network device for the first terminal device, to further ensure data transmission reliability.

In one embodiment, before the first terminal device receives the first indication information sent by the network device, the method further includes:

the first terminal device sends second indication information to the network device, where the second indication information is used to indicate a quantity of target resource units in a target measurement resource set that meet a second preset condition, and/or the second indication information is used to indicate a proportion of the target resource units in the target measurement resource set that meet the second preset condition in the target measurement resource set, where the second preset condition includes at least one of the following:

power on the target resource unit is less than or equal to a third power threshold;

the power on the target resource unit is greater than or equal to a fourth power threshold;

the power on the target resource unit falls within a third power range; and the power on the target resource unit falls beyond a fourth power range.

For specific descriptions of the second indication information, the target measurement resource set, and the second preset condition, refer to the foregoing related descriptions. Details are not described herein again.

Therefore, according to the data transmission method in this embodiment of this application, the first terminal device reports, to the network device, the second indication information that is used to indicate a size of a target resource unit (for example, a size and/or a proportion of the target resource unit) that meets the second preset condition in the target measurement resource set. In comparison with the prior art in which the first terminal device reports, to the network device, a specific location of a resource that meets a condition (for example, a resource with relatively weak interference or a resource with strong interference), space resources occupied by signaling can be reduced especially when a relatively large quantity of resources are reported, thereby reducing a delay caused by reporting the specific location, and improving timeliness of scheduling by the network device.

In one embodiment, a carrier of a resource in the target measurement resource set is a second carrier;

a subcarrier spacing of a resource in the target measurement resource set is a second subcarrier spacing;

a transmission time interval of a resource in the target measurement resource set is a second transmission time interval;

a time domain range corresponding to a resource in the target measurement resource set belongs to a second time domain range; or a frequency domain range corresponding to a resource in the target measurement resource set belongs to a second frequency domain range.

For further specific descriptions of the target measurement resource set, refer to the foregoing related descriptions. Details are not described herein again.

In one embodiment, resources in the target measurement resource set at least partially overlap with resources in the first resource set.

In one embodiment, the first resource set includes a common resource, and the common resource is a resource shared by the first terminal device and the second terminal device.

In one embodiment, the first indication information is corresponding to at least one of the following content: a data priority, a service type, a destination address, data reliability, and a data delay.

The data transmission method in the embodiments of this application is described in detail above with reference to FIG. 1 to FIG. 4, and a data transmission apparatus in the embodiments of this application is described below with reference to FIG. 5 and FIG. 6. Technical features described in the method embodiments are also applicable to the following apparatus embodiments.

Figure 5:
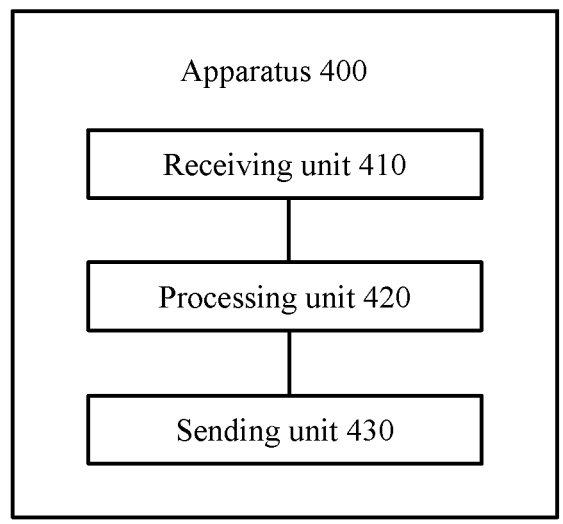
FIG. 5 and FIG. 6 are schematic block diagrams of a data transmission apparatus according to an embodiment of this application.

FIG. 5 is a schematic block diagram of a data transmission apparatus 400 according to an embodiment of this application. As shown in FIG. 5, the apparatus 400 includes:

a receiving unit 410, configured to receive first indication information sent by a network device, where the first indication information is used to indicate a first preset condition, and the first preset condition is used to determine a resource used for sending data;

a processing unit 420, configured to determine, from a first resource set according to the first indication information, a first resource that meets the first preset condition; and a sending unit 430, configured to send first data by using the first resource.

Therefore, according to the data transmission apparatus in this embodiment of this application, the network device sends the first indication information that is used to indicate the first preset condition, so that the apparatus can determine the first resource based on the first preset condition indicated by the first indication information. Compared with a prior-art manner in which the apparatus independently selects the first resource, this embodiment can reduce a case in which the apparatus and another terminal device send data by using a same resource (in other words, reduce a resource collision probability), to implement global system optimization and improve data transmission reliability.

In one embodiment, the first preset condition includes at least one of the following:

a carrier of a resource used for sending data belongs to at least one carrier;

a subcarrier spacing of the resource used for sending data belongs to at least one subcarrier spacing;

a transmission time interval of the resource used for sending data belongs to at least one transmission time interval;

a quantity of resource units of the resource used for sending data is greater than or equal to a first value;

the quantity of resource units of the resource used for sending data is less than or equal to a second value;

the quantity of resource units of the resource used for sending data falls within a first value range;

power on the resource used for sending data is less than or equal to a first power threshold;

the power on the resource used for sending data is greater than or equal to a second power threshold;

the power on the resource used for sending data falls within a first power range;

the power on the resource used for sending data falls beyond a second power range;

a time domain range corresponding to the resource used for sending data belongs to a first time domain range; and a frequency domain range corresponding to the resource used for sending data belongs to a first frequency domain range.

In one embodiment, if the first preset condition includes that the carrier of the resource used for sending data belongs to the at least one carrier, the first indication information includes information used to indicate the at least one carrier;

if the first preset condition includes that the subcarrier spacing of the resource used for sending data belongs to the at least one subcarrier spacing, the first indication information includes information used to indicate the at least one subcarrier spacing;

if the first preset condition includes that the transmission time interval of the resource used for sending data belongs to the at least one transmission time interval, the first indication information includes information used to indicate the at least one transmission time interval;

if the first preset condition includes that the quantity of resource units of the resource used for sending data is greater than or equal to the first value, the first indication information includes information used to indicate the first value;

if the first preset condition includes that the quantity of resource units of the resource used for sending data is less than or equal to the second value, the first indication information includes information used to indicate the second value;

if the first preset condition includes that the quantity of resource units of the resource used for sending data falls within the first value range, the first indication information includes information used to indicate the first value range;

if the first preset condition includes that the power on the resource used for sending data is less than or equal to the first power threshold, the first indication information includes information used to indicate the first power threshold;

if the first preset condition includes that the power on the resource used for sending data is greater than or equal to the second power threshold, the first indication information includes information used to indicate the second power threshold;

if the first preset condition includes that the power on the resource used for sending data falls within the first power range, the first indication information includes information used to indicate the first power range;

if the first preset condition includes that the power on the resource used for sending data falls beyond the second power range, the first indication information includes information used to indicate the second power range;

if the first preset condition includes that the time domain range corresponding to the resource used for sending data belongs to the first time domain range, the first indication information includes information used to indicate the first time domain range; or if the first preset condition includes that the frequency domain range corresponding to the resource used for sending data belongs to the first frequency domain range, the first indication information includes information used to indicate the first frequency domain range.

In one embodiment, the processing unit 420 is further configured to:

determine a second resource configured by the network device for the first terminal device; and the sending unit 430 is specifically configured to:

send the first data by using the first resource and the second resource.

Therefore, according to the data transmission apparatus in this embodiment of this application, when interference to a resource in the first resource set is relatively strong, a resource that can be used to send the first data may be difficult to meet quality of service of the data. In this case, the apparatus may send the first data by using the determined first resource and the second resource configured by the network device for the first terminal device, to further ensure data transmission reliability.

In one embodiment, the sending unit is further configured to:

send second indication information to the network device, where the second indication information is used to indicate a quantity of target resource units in a target measurement resource set that meet a second preset condition, and/or the second indication information is used to indicate a proportion of the target resource units in the target measurement resource set that meet the second preset condition in the target measurement resource set, where the second preset condition includes at least one of the following:

power on the target resource unit is less than or equal to a third power threshold;

the power on the target resource unit is greater than or equal to a fourth power threshold;

the power on the target resource unit falls within a third power range; and the power on the target resource unit falls beyond a fourth power range.

Therefore, according to the data transmission apparatus in this embodiment of this application, the apparatus reports, to the network device, the second indication information that is used to indicate a size of a target resource unit (for example, a size and/or a proportion of the target resource unit) that meets the second preset condition in the target measurement resource set. In comparison with the prior art in which the apparatus reports, to the network device, a specific location of a resource that meets a condition (for example, a resource with relatively weak interference or a resource with strong interference), space resources occupied by signaling can be reduced especially when a relatively large quantity of resources are reported, thereby reducing a delay caused by reporting the specific location, and improving timeliness of scheduling by the network device.

In one embodiment, a carrier of a resource in the target measurement resource set is a second carrier;

a subcarrier spacing of a resource in the target measurement resource set is a second subcarrier spacing;

a transmission time interval of a resource in the target measurement resource set is a second transmission time interval;

a time domain range corresponding to a resource in the target measurement resource set belongs to a second time domain range; or a frequency domain range corresponding to a resource in the target measurement resource set belongs to a second frequency domain range.

In one embodiment, resources in the target measurement resource set at least partially overlap with resources in the first resource set.

In one embodiment, the first resource set includes a common resource, and the common resource is a resource shared by the first terminal device and a second terminal device.

In one embodiment, the first indication information is corresponding to at least one of the following content:

a data priority, a service type, a destination address, data reliability, and a data delay.

In one embodiment, the sending unit 430 is specifically configured to:

send the first data to the second terminal device or the network device.

The data transmission apparatus 400 may be corresponding to the first terminal device in the foregoing method 200 or 300 (for example, the data transmission apparatus 400 may be configured as the first terminal device or may be the first terminal device), and modules or units in the data transmission apparatus 400 are separately configured to perform actions or processing processes performed by the first terminal device in the foregoing method 200 or 300. To avoid repetition, details are not described herein again.

In one embodiment of this application, the apparatus 400 may be the first terminal device. In this case, the apparatus 400 may include a processor, a transmitter, and a receiver. The processor, the transmitter, and the receiver are communicatively connected. In one embodiment, the apparatus further includes a memory, and the memory is communicatively connected to the processor. In one embodiment, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the receiving unit in the apparatus 400 shown in FIG. 5 may be corresponding to the receiver, the processing unit in the apparatus 400 shown in FIG. 5 may be corresponding to the processor, and the sending unit in the apparatus 400 shown in FIG. 5 may be corresponding to the transmitter. In another implementation, the transmitter and the receiver may be implemented by a same part, namely, a transceiver.

In one embodiment of this application, the apparatus 400 may be a chip (or a chip system) installed in the first terminal device. In this case, the apparatus 400 may include a processor and an input/output interface. The processor may be communicatively connected to a transceiver of the network device through the input/output interface. In one embodiment, the apparatus further includes a memory, and the memory is communicatively connected to the processor. In one embodiment, the processor, the memory, and the transceiver may be communicatively connected. The memory may be configured to store an instruction. The processor is configured to execute the instruction stored in the memory, to control the transceiver to send information or a signal.

In this case, the receiving unit in the apparatus 400 shown in FIG. 5 may be corresponding to the input interface, the processing unit in the apparatus 400 shown in FIG. 5 may be corresponding to the processor, and the sending unit in the apparatus 400 shown in FIG. 5 may be corresponding to the output interface.

Figure 6:
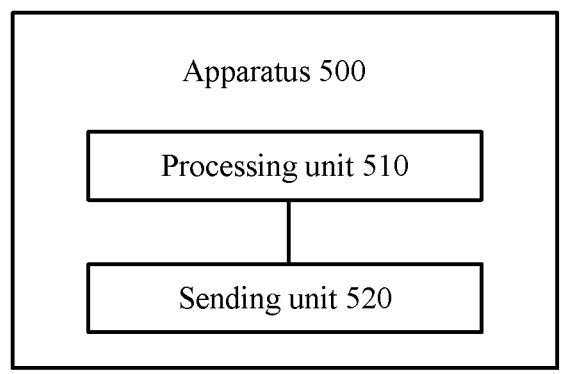

FIG. 6 is a schematic block diagram of a data transmission apparatus 500 according to an embodiment of this application. As shown in FIG. 6, the apparatus 500 includes:

a processing unit 510, configured to determine first indication information, where the first indication information is used to indicate a first preset condition, and the first preset condition is used to determine a first resource; and a sending unit 520, configured to send the first indication information to a first terminal device.

Therefore, according to the data transmission apparatus in this embodiment of this application, the apparatus sends the first indication information that is used to indicate the first preset condition, so that the first terminal device (any terminal device in at least one terminal device) can determine the first resource based on the first preset condition indicated by the first indication information. Compared with a prior-art manner in which the first terminal device independently selects the first resource, this embodiment can reduce a case in which the first terminal device and another terminal device send data by using a same resource (in other words, reduce a resource collision probability), to implement global system optimization and improve data transmission reliability.

In one embodiment, the first preset condition includes at least one of the following:

a carrier of a resource used for sending data belongs to at least one carrier;

a subcarrier spacing of the resource used for sending data belongs to at least one subcarrier spacing;

a transmission time interval of the resource used for sending data belongs to at least one transmission time interval;

a quantity of resource units of the resource used for sending data is greater than or equal to a first value;

the quantity of resource units of the resource used for sending data is less than or equal to a second value;

the quantity of resource units of the resource used for sending data falls within a first value range;

power on the resource used for sending data is less than or equal to a first power threshold;

the power on the resource used for sending data is greater than or equal to a second power threshold;

the power on the resource used for sending data falls within a first power range;

the power on the resource used for sending data falls beyond a second power range;

a time domain range corresponding to the resource used for sending data belongs to a first time domain range; and a frequency domain range corresponding to the resource used for sending data belongs to a first frequency domain range.

In one embodiment, if the first preset condition includes that the carrier of the resource used for sending data belongs to the at least one carrier, the first indication information includes information used to indicate the at least one carrier;

if the first preset condition includes that the subcarrier spacing of the resource used for sending data belongs to the at least one subcarrier spacing, the first indication information includes information used to indicate the at least one subcarrier spacing;

if the first preset condition includes that the transmission time interval of the resource used for sending data belongs to the at least one transmission time interval, the first indication information includes information used to indicate the at least one transmission time interval;

if the first preset condition includes that the quantity of resource units of the resource used for sending data is greater than or equal to the first value, the first indication information includes information used to indicate the first value;

if the first preset condition includes that the quantity of resource units of the resource used for sending data is less than or equal to the second value, the first indication information includes information used to indicate the second value;

if the first preset condition includes that the quantity of resource units of the resource used for sending data falls within the first value range, the first indication information includes information used to indicate the first value range;

if the first preset condition includes that the power on the resource used for sending data is less than or equal to the first power threshold, the first indication information includes information used to indicate the first power threshold;

if the first preset condition includes that the power on the resource used for sending data is greater than or equal to the second power threshold, the first indication information includes information used to indicate the second power threshold;

if the first preset condition includes that the power on the resource used for sending data falls within the first power range, the first indication information includes information used to indicate the first power range;

if the first preset condition includes that the power on the resource used for sending data falls beyond the second power range, the first indication information includes information used to indicate the second power range;

if the first preset condition includes that the time domain range corresponding to the resource used for sending data belongs to the first time domain range, the first indication information includes information used to indicate the first time domain range; or if the first preset condition includes that the frequency domain range corresponding to the resource used for sending data belongs to the first frequency domain range, the first indication information includes information used to indicate the first frequency domain range.

In one embodiment, the apparatus further includes:

a receiving unit 530, configured to receive second indication information sent by the first terminal device, where the second indication information is used to indicate a quantity of target resource units in a target measurement resource set that meet a second preset condition, and/or the second indication information is used to indicate a proportion of the target resource units in the target measurement resource set that meet the second preset condition in the target measurement resource set, where the second preset condition includes at least one of the following:

power on the target resource unit is less than or equal to a third power threshold;

the power on the target resource unit is greater than or equal to a fourth power threshold;

the power on the target resource unit falls within a third power range; and the power on the target resource unit falls beyond a fourth power range.

Therefore, according to the data transmission apparatus in this embodiment of this application, the first terminal device reports, to the apparatus, the second indication information that is used to indicate a size of a target resource unit (for example, a size and/or a proportion of the target resource unit) that meets the second preset condition in the target measurement resource set. In comparison with the prior art in which the first terminal device reports, to the network device, a specific location of a resource that meets a condition (for example, a resource with relatively weak interference or a resource with strong interference), space resources occupied by signaling can be reduced especially when a relatively large quantity of resources are reported, thereby reducing a delay caused by reporting the specific location, and improving timeliness of scheduling by the network device.

In one embodiment, a carrier of a resource in the target measurement resource set is a second carrier;

a subcarrier spacing of a resource in the target measurement resource set is a second subcarrier spacing;

a transmission time interval of a resource in the target measurement resource set is a second transmission time interval;

a time domain range corresponding to a resource in the target measurement resource set belongs to a second time domain range; or a frequency domain range corresponding to a resource in the target measurement resource set belongs to a second frequency domain range.

In one embodiment, the first resource belongs to a first resource set, and resources in the target measurement resource set at least partially overlap with resources in the first resource set.

In one embodiment, the first resource belongs to a first resource set, the first resource set includes a common resource, and the common resource is a resource shared by the first terminal device and a second terminal device.

In one embodiment, the first indication information is corresponding to at least one of the following content:

a data priority, a service type, a destination address, data reliability, and a data delay.

The data transmission apparatus 500 may be corresponding to the network device in the foregoing method 200 or 300 (for example, the data transmission apparatus 500 may be configured as the network device or may be the network device), and modules or units in the data transmission apparatus 500 are separately configured to perform actions or processing processes performed by the network device in the foregoing method 200 or 300. To avoid repetition, details are not described herein again.

In this embodiment of this application, the apparatus 500 may be the network device. In this case, the apparatus 500 may include a processor, a transmitter, and a receiver. The processor, the transmitter, and the receiver are communicatively connected. In one embodiment, the apparatus further includes a memory, and the memory is communicatively connected to the processor. In one embodiment, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the processing unit in the apparatus 500 shown in FIG. 6 may be corresponding to the processor, and the receiving unit in the apparatus 500 shown in FIG. 6 may be corresponding to the receiver.

In this embodiment of this application, the apparatus 500 may be a chip (or a chip system) installed in the network device. In this case, the apparatus 500 may include a processor and an input/output interface. The processor may be communicatively connected to a transceiver of the network device through the input/output interface. In one embodiment, the apparatus further includes a memory, and the memory is communicatively connected to the processor. In one embodiment, the processor, the memory, and the transceiver may be communicatively connected. The memory may be configured to store an instruction. The processor is configured to execute the instruction stored in the memory, to control the transceiver to send information or a signal.

In this case, the processing unit in the apparatus 500 shown in FIG. 6 may be corresponding to the processor, and the receiving unit in the apparatus 500 shown in FIG. 6 may be corresponding to the input interface.

It should be noted that, the foregoing method embodiments in the embodiments of this application may be applied to the processor, or implemented by the processor. The processor may be an integrated circuit chip and has a signal processing capability. In an implementation process, operations in the foregoing method embodiments may be completed by using an integrated logic circuit of hardware in the processor, or by using an instruction in a form of software. The processor may be a general purpose processor, a digital signal processor (DSP), an application-specific integrated circuit (ASIC), a field programmable gate array (FPGA), another programmable logic device, a discrete gate, a transistor logic device, or a discrete hardware component. The processor may implement or perform the methods, the operations, and the logical block diagrams that are disclosed in the embodiments of this application. The general purpose processor may be a microprocessor, or the processor may be any conventional processor or the like. Steps in the methods disclosed with reference to the embodiments of this application may be directly performed and completed by using a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware in the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory in the systems and methods described in this specification includes but is not limited to these and any memory of another proper type.

It should be understood that sequence numbers of the foregoing processes do not mean execution sequences. The execution sequences of the processes should be determined based on functions and internal logic of the processes, and should not be construed as any limitation on the implementation processes of the embodiments of this application.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, wherein the method comprises:

sending, by a first terminal device, second indication information to a network device, wherein the second indication information is used to indicate a quantity of target resource units and/or a proportion of the target resource units in a target measurement resource set that meet a second preset condition in the target measurement resource set;

receiving, by the first terminal device, first indication information sent by the network device, wherein the first indication information is used to indicate a first preset condition, and the first preset condition is used to determine a resource used for sending data;

determining, by the first terminal device from a first resource set according to the first indication information, a first resource that meets the first preset condition; and sending, by the first terminal device, first data by using the first resource;

wherein the second preset condition comprises at least one of the following:

power on a target resource unit is less than or equal to a third power threshold:

the power on the target resource unit is greater than or equal to a fourth power threshold;

the power on the target resource unit falls within a third power range; or the power on the target resource unit falls beyond a fourth power range.

2. The method according to claim 1, wherein the first preset condition comprises at least one of the following: a carrier of the resource used for sending data belongs to a first carrier;

a subcarrier spacing of the resource used for sending data belongs to a first subcarrier spacing;

a transmission time interval of the resource used for sending data belongs to a first transmission time interval;

a quantity of resource units of the resource used for sending data is greater than or equal to a first value;

the quantity of resource units of the resource used for sending data is less than or equal to a second value;

the quantity of resource units of the resource used for sending data falls within a first value range;

power on the resource used for sending data is less than or equal to a first power threshold;

the power on the resource used for sending data is greater than or equal to a second power threshold;

the power on the resource used for sending data falls within a first power range;

the power on the resource used for sending data is beyond a second power range;

a time domain range corresponding to the resource used for sending data belongs to a first time domain range; or a frequency domain range corresponding to the resource used for sending data belongs to a first frequency domain range.

3. The method according to claim 2, wherein if the first preset condition comprises that the carrier of the resource used for sending data belongs to the first carrier, the first indication information comprises information used to indicate the first carrier;

if the first preset condition comprises that the subcarrier spacing of the resource used for sending data belongs to the first subcarrier spacing, the first indication information comprises information used to indicate the first subcarrier spacing;

if the first preset condition comprises that the transmission time interval of the resource used for sending data belongs to the first transmission time interval, the first indication information comprises information used to indicate the first transmission time interval;

if the first preset condition comprises that the quantity of resource units of the resource used for sending data is greater than or equal to the first value, the first indication information comprises information used to indicate the first value;

if the first preset condition comprises that the quantity of resource units of the resource used for sending data is less than or equal to the second value, the first indication information comprises information used to indicate the second value;

if the first preset condition comprises that the quantity of resource units of the resource used for sending data falls within the first value range, the first indication information comprises information used to indicate the first value range;

if the first preset condition comprises that the power on the resource used for sending data is less than or equal to the first power threshold, the first indication information comprises information used to indicate the first power threshold;

if the first preset condition comprises that the power on the resource used for sending data is greater than or equal to the second power threshold, the first indication information comprises information used to indicate the second power threshold;

if the first preset condition comprises that the power on the resource used for sending data falls within the first power range, the first indication information comprises information used to indicate the first power range;

if the first preset condition comprises that the power on the resource used for sending data falls beyond the second power range, the first indication information comprises information used to indicate the second power range;

if the first preset condition comprises that the time domain range corresponding to the resource used for sending data belongs to the first time domain range, the first indication information comprises information used to indicate the first time domain range; or if the first preset condition comprises that the frequency domain range corresponding to the resource used for sending data belongs to the first frequency domain range, the first indication information comprises information used to indicate the first frequency domain range.

4. The method according to claim 1, wherein the method further comprises:

determining, by the first terminal device, a second resource configured by the network device for the first terminal device; and the sending, by the first terminal device, first data by using the first resource comprises:

sending, by the first terminal device, the first data by using the first resource and the second resource.

5. The method according to claim 1, wherein a carrier of a resource in the target measurement resource set is a second carrier;

a subcarrier spacing of a resource in the target measurement resource set is a second subcarrier spacing;

a transmission time interval of a resource in the target measurement resource set is a second transmission time interval;

a time domain range corresponding to a resource in the target measurement resource set belongs to a second time domain range; or a frequency domain range corresponding to a resource in the target measurement resource set belongs to a second frequency domain range.

6. The method according to claim 1, wherein resources in the target measurement resource set at least partially overlap with resources in the first resource set.

7. The method according to claim 1, wherein the first resource set comprises a common resource, and the common resource is a resource shared by the first terminal device and a second terminal device.

8. The method according to claim 1, wherein the first indication information corresponds to at least one of the following: a data priority, a service type, a destination address, data reliability, a data delay, or a quality of service flow.

9. The method according to claim 1, wherein the sending, by the first terminal device, first data by using the first resource comprises: sending, by the first terminal device, the first data to a second terminal device or the network device.

10. A data transmission apparatus, wherein the apparatus comprises: a sending unit, configured to send second indication Information to a network device, wherein the second indication information is used to indicate a quantity of target resource units and/or a proportion of the target resource units in a target measurement resource set that meet a second preset condition in the target measurement resource set;

a receiving unit, configured to receive first indication information sent by a-the network device, wherein the first indication information is used to indicate a first preset condition, and the first preset condition is used to determine a resource used for sending data; and a processing unit, configured to determine, from a first resource set according to the first indication information, a first resource that meets the first preset condition; and the sending unit, is further configured to send first data by using the first resource;

wherein the second preset condition comprises at least one of the following:

power on a target resource unit is less than or equal to a third power threshold:

the power on the target resource unit is greater than or equal to a fourth power threshold;

the power on the target resource unit falls within a third power range; or the power on the target resource unit falls beyond a fourth power range.

11. The apparatus according to claim 10, wherein the first preset condition comprises at least one of the following: a carrier of the resource used for sending data belongs to a first carrier;

a subcarrier spacing of the resource used for sending data belongs to a first subcarrier spacing;

a transmission time interval of the resource used for sending data belongs to a first transmission time interval;

a quantity of resource units of the resource used for sending data is greater than or equal to a first value;

the quantity of resource units of the resource used for sending data is less than or equal to a second value;

the quantity of resource units of the resource used for sending data falls within a first value range;

power on the resource used for sending data is less than or equal to a first power threshold;

the power on the resource used for sending data is greater than or equal to a second power threshold;

the power on the resource used for sending data falls within a first power range;

the power on the resource used for sending data falls beyond a second power range;

a time domain range corresponding to the resource used for sending data belongs to a first time domain range; or a frequency domain range corresponding to the resource used for sending data belongs to a first frequency domain range.

12. The apparatus according to claim 11, wherein if the first preset condition comprises that the carrier of the resource used for sending data belongs to the first carrier, the first indication information comprises information used to indicate the first carrier;

if the first preset condition comprises that the subcarrier spacing of the resource used for sending data belongs to the first subcarrier spacing, the first indication information comprises information used to indicate the first subcarrier spacing;

if the first preset condition comprises that the transmission time interval of the resource used for sending data belongs to the first transmission time interval, the first indication information comprises information used to indicate the first transmission time interval;

if the first preset condition comprises that the quantity of resource units of the resource used for sending data is greater than or equal to the first value, the first indication information comprises information used to indicate the first value;

if the first preset condition comprises that the quantity of resource units of the resource used for sending data is less than or equal to the second value, the first indication information comprises information used to indicate the second value;

if the first preset condition comprises that the quantity of resource units of the resource used for sending data falls within the first value range, the first indication information comprises information used to indicate the first value range;

if the first preset condition comprises that the power on the resource used for sending data is less than or equal to the first power threshold, the first indication information comprises information used to indicate the first power threshold;

if the first preset condition comprises that the power on the resource used for sending data is greater than or equal to the second power threshold, the first indication information comprises information used to indicate the second power threshold;

if the first preset condition comprises that the power on the resource used for sending data falls within the first power range, the first indication information comprises information used to indicate the first power range;

if the first preset condition comprises that the power on the resource used for sending data falls beyond the second power range, the first indication information comprises information used to indicate the second power range;

if the first preset condition comprises that the time domain range corresponding to the resource used for sending data belongs to the first time domain range, the first indication information comprises information used to indicate the first time domain range; or if the first preset condition comprises that the frequency domain range corresponding to the resource used for sending data belongs to the first frequency domain range, the first indication information comprises information used to indicate the first frequency domain range.

13. The apparatus according to claim 10, wherein the processing unit is further configured to: determine a second resource configured by the network device for the apparatus; and the sending unit is configured to: send the first data by using the first resource and the second resource.

14. The apparatus according to claim 11, wherein a carrier of a resource in the target measurement resource set is a second carrier;

a subcarrier spacing of a resource in the target measurement resource set is a second subcarrier spacing;

a transmission time interval of a resource in the target measurement resource set is a second transmission time interval;

a time domain range corresponding to a resource in the target measurement resource set belongs to a second time domain range; or a frequency domain range corresponding to a resource in the target measurement resource set belongs to a second frequency domain range.

15. The apparatus according to claim 11, wherein resources in the target measurement resource set at least partially overlap with resources in the first resource set.

16. The apparatus according to claim 10, wherein the first resource set comprises a common resource, and the common resource is a resource shared by the apparatus and a second terminal device.

17. The apparatus according to claim 10, wherein the first indication information corresponds to at least one of the following: a data priority, a service type, a destination address, data reliability, a data delay, or a quality of service flow.

18. The apparatus according to claim 10, wherein the sending unit is configured to: send the first data to +he-a second terminal device or the network device.

* * * * *

UNITED STATES PATENT AND TRADEMARK OFFICE
CERTIFICATE OF CORRECTION

PATENT NO. : 11,382,102 B2
APPLICATION NO. : 16/898866
DATED : July 5, 2022
INVENTOR(S) : Hang Liu et al.

Page 1 of 1

It is certified that error appears in the above-identified patent and that said Letters Patent is hereby corrected as shown below:

In the Claims

In Claim 1, Column 48, Line 42, replace "threshold:" with --threshold;--.

In Claim 10, Column 50, Line 51, replace "sent by a-the network" with --sent by the network--.

In Claim 10, Column 50, Line 65, replace "threshold:" with --threshold;--.

In Claim 14, Column 52, Line 36, replace "claim 11" with --claim 10--.

In Claim 15, Column 52, Line 50, replace "claim 11" with --claim 10--.

In Claim 16, Column 52, Line 55, replace "1s" with --is--.

In Claim 18, Column 52, Line 63, replace "+he-a" with --a--.

Signed and Sealed this
Ninth Day of April, 2024

Katherine Kelly Vidal
*Director of the United States Patent and Trademark Office*